(12) United States Patent
Jalil et al.

(10) Patent No.: US 7,873,224 B2
(45) Date of Patent: Jan. 18, 2011

(54) ENHANCED IMAGE/VIDEO QUALITY THROUGH ARTIFACT EVALUATION

(75) Inventors: Suhail Jalil, Poway, CA (US); Khaled Helmi El-Maleh, San Diego, CA (US); Chienchung Chang, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1358 days.

(21) Appl. No.: 11/366,787

(22) Filed: Mar. 1, 2006

(65) Prior Publication Data

US 2007/0206871 A1 Sep. 6, 2007

(51) Int. Cl.
*G06K 9/36* (2006.01)

(52) U.S. Cl. .................... 382/232; 348/384.1

(58) Field of Classification Search ............... 382/100, 382/232, 233, 235, 236, 237, 238, 239, 243, 382/244, 245, 246, 247, 248, 249, 250; 345/555; 348/384.1–440.1; 358/426.01–426.16; 375/122; 708/203

See application file for complete search history.

(56) References Cited

U.S. PATENT DOCUMENTS

| | | | | |
|---|---|---|---|---|
| 7,027,661 | B2 * | 4/2006 | Estevez et al. | 382/275 |
| 7,116,828 | B2 * | 10/2006 | Wells | 382/233 |
| 2003/0053708 | A1 | 3/2003 | Kryukov et al. | |
| 2004/0062310 | A1 * | 4/2004 | Xue et al. | 375/240.16 |

FOREIGN PATENT DOCUMENTS

| | | |
|---|---|---|
| EP | 0571171 A2 | 11/1993 |
| EP | 0961229 A2 | 12/1999 |
| WO | 00/22834 A2 | 4/2000 |
| WO | 01/20912 A1 | 3/2001 |
| WO | 2004/054274 A1 | 6/2004 |
| WO | 2005/086490 A1 | 11/2007 |

OTHER PUBLICATIONS

International Search Report, PCT/US2007/063095, Mar. 1, 2007.
"Metric (mathematics)" Wikipedia (EN), [Online] Aug. 24, 2007, Retrieved from the Internet: URL:http://en.wikipeida.org/w/index.php?title=Metric_space&oldid=149249903>[retrieved on Aug. 24, 2007].
Sun, X. et al., "In-loop deblocking filter for block based video coding," 6th International Conference on Signal Processing, vol. 1, Aug. 26-30, 2002 pp. 33-36.

(Continued)

*Primary Examiner*—Anand Bhatnagar
(74) *Attorney, Agent, or Firm*—Alexander C. Chen; Espartaco Diaz Hidalgo

(57) ABSTRACT

In an image/video encoding and decoding system employing an artifact evaluator a method and/or apparatus to process video blocks comprising a decoder operable to synthesize an un-filtered reconstructed video block or frame and an artifact filter operable to receive the un-filtered reconstructed video block or frame, which generates a filtered reconstructed video block or frame. A memory buffer operable to store either the filtered reconstructed video block or frame or the un-filtered reconstructed video block or frame, and an artifact evaluator operable to update the memory buffer after evaluating and determining which of the filtered video block or frame, or the un-filtered video block or frame yields better image/video quality.

40 Claims, 14 Drawing Sheets

OTHER PUBLICATIONS

Gao, W. et al. "A de-blocking algorithm and a blockiness metric for highly compressed images," IEEE Transactions on Circuits and Systems for Video Technology, vol. 12, Issue 12, Dec. 2002 pp. 1150-1159.

Cheung, W.-F. & Chan, Y.-H., "Improving MPEG-4 coding performance by jointly optimising compression and blocking effect elimination," IEE Proceedings-Vision, Image and Signal Processing, vol. 148, Issue 3, Jun. 2001 pp. 194-201.

Karunasekera, S. A. & Kingsbury, N.G., "A distortion measure for blocking artifacts in images based on human visual sensitivity," IEEE Transactions on Image Processing, vol. 4, Issue 6, Jun. 1995 pp. 713-724.

* cited by examiner

ENHANCED IMAGE/VIDEO QUALITY THROUGH ARTIFACT EVALUATION

TECHNICAL FIELD

This disclosure relates to digital image and video processing and, more particularly, enhanced image/video quality through artifact evaluation.

BACKGROUND

Digital video capabilities may be incorporated into a wide range of devices, including digital televisions, digital direct broadcast systems, wireless communication devices, personal digital assistants (PDAs), laptop computers, desktop computers, digital cameras, digital recording devices, mobile or satellite radio telephones, and the like. Digital video and picture devices can provide significant improvements over conventional analog video and picture systems in creating, modifying, transmitting, storing, recording and playing full motion video sequences and pictures. Video sequences (also referred to as video clips) are composed of a sequence of frames. A picture can also be represented as a frame. Any frame or part of a frame from a video or a picture is often called an image.

Digital devices such as mobile phones and hand-held digital cameras can take both pictures and/or video. The pictures and video sequences may be stored and transmitted to another device either wirelessly or through a cable. Prior to transmission the frame may be sampled and digitized. Once digitized, the frame may be parsed into smaller blocks and encoded. Encoding is sometimes synonymous with compression. Compression can reduce the overall (usually redundant) amount of data (i.e., bits) needed to represent a frame. By compressing video and image data, many image and video encoding standards allow for improved transmission rates of video sequences and images. Typically compressed video sequences and compressed images are referred to as encoded bitstream, encoded packets, or bitstream. Most image and video encoding standards utilize image/video compression techniques designed to facilitate video and image transmission with less transmitted bits than those used without compression techniques.

In order to support compression, a digital video and/or picture device typically includes an encoder for compressing digital video sequences or compressing a picture, and a decoder for decompressing the digital video sequences. In many cases, the encoder and decoder form an integrated encoder/decoder (CODEC) that operates on blocks of pixels within frames that define the video sequence. In standards, such as the International Telecommunication Union (ITU) H.264 and Moving Picture Experts Group (MPEG)-4, Joint Photographic Experts Group (JPEG), for example, the encoder typically divides a video frame or image to be transmitted into video blocks referred to as "macroblocks." A macroblock is typically 16 pixels high by 16 pixels wide. Various sizes of video blocks may be used. Those ordinarily skilled in the art of image and video processing recognize that the term video block, or image block may be used interchangeably. Sometimes to be explicit in their interchangeability, the term image/video block is used. The ITU H.264 standard supports processing 16 by 16 video blocks, 16 by 8 video blocks, 8 by 16 image blocks, 8 by 8 image blocks, 8 by 4 image blocks, 4 by 8 image blocks and 4 by 4 image blocks. Other standards may support differently sized image blocks. Someone ordinarily skilled in the art sometimes use video block or frame interchangeably when describing an encoding process, and sometimes may refer to video block or frame as video matter. In general, video encoding standards support encoding and decoding a video unit, wherein a video unit may be a video block or a video frame.

For each video block in a video frame, an encoder operates in a number of "prediction" modes. In one mode, the encoder searches similarly sized video blocks of one or more immediately preceding video frames (or subsequent frames) to identify the most similar video block, referred to as the "best prediction block." The process of comparing a current video block to video blocks of other frames is generally referred to as block-level motion estimation (BME). BME produces a motion vector for the respective block. Once a "best prediction block" is identified for a current video block, the encoder can encode the differences between the current video block and the best prediction block. This process of using the differences between the current video block and the best prediction block includes a process referred to as motion compensation. In particular, motion compensation usually refers to the act of fetching the best prediction block using a motion vector, and then subtracting the best prediction block from an input video block to generate a difference block. After motion compensation, a series of additional encoding steps are typically performed to finish encoding the difference block. These additional encoding steps may depend on the encoding standard being used. In another mode, the encoder searches similarly sized video blocks of one or more neighboring video blocks within the same frame and uses information from those blocks to aid in the encoding process.

In general, as part of the encoding process, a transform of the video block (or difference video block) is taken. The transform converts the video block (or difference video block) from being represented by pixels to being represented by transform coefficients. A typical transform in video encoding is called the Discrete Cosine Transform (DCT). The DCT transforms the video block data from the pixel domain to a spatial frequency domain. In the spatial frequency domain, data is represented by DCT block coefficients. The DCT block coefficients represent the number and degree of the spatial frequencies detected in the video block. After a DCT is computed, the DCT block coefficients may be quantized, in a process known as "block quantization." Quantization of the DCT block coefficients (coming from either the video block or difference video block) removes part of the spatial redundancy from the block. During this "block quantization" process, further spatial redundancy may sometimes be removed by comparing the quantized DCT block coefficients to a threshold. If the magnitude of a quantized DCT block coefficient is less than the threshold, the coefficient is discarded or set to a zero value.

However, block quantization at the encoder may often cause different artifacts to appear at the decoder when reconstructing the video frames or images that have been compressed at the encoder. An example of an artifact is when blocks appear in the reconstructed video image, this is known as "blockiness." Some standards have tried to address this problem by including a de-blocking filter as part of the encoding process. In some cases, the de-blocking filter removes the blockiness but also has the effect of smearing or blurring the video frame or image, which is known as a blurriness artifact. Hence, image/video quality suffers either from "blockiness" or blurriness from de-blocking filters. A method and apparatus that could reduce the effect of coding artifacts on the perceived visual quality may be a significant benefit.

SUMMARY

The details of one or more embodiments are set forth in the accompanying drawings and the description below. Other features, objects, and advantages will be apparent from the description, drawings and claims. In general, an image/video encoding and decoding system employing an artifact evaluator that processes video blocks may enhance image/video quality. During an encoding process, a texture decoder and a video block or frame resulting from an inter-coding or intra-coding prediction mode synthesizes an un-filtered reconstructed video block or frame. The un-filtered reconstructed video block or frame is passed through an artifact filter to yield a filtered reconstructed video block or frame. The artifact filter may be a de-blocking filter or configured to be a de-blocking filter. If the artifact filter is a de-blocking filter or configured to be one, it may suppress blockiness. However, after filtering, the resulting filtered reconstructed video block or frame may be blurry. Current encoding methods and standards are limited because they do not have a way to "adaptively" change how an in-loop memory buffer is updated. Because of this limitation in current encoding methods and standards, poor image/video quality is propagated to other frames, especially for inter-coding prediction mode.

The use of an artifact evaluator may overcome the limitations of the current encoding methods and standards. The use of an artifact evaluator evaluates and determines based on perceived image/video quality when it is better to use the output of an artifact filter such as a de-blocking filter, or when it is better to use the input of an artifact filter such as a de-blocking filter to update the in-loop memory buffer. The use of an artifact evaluator may not only enhance the image/video quality of current methods and standards of the current frame, but may also offer an additional advantage of preventing poor image/video quality propagation to subsequent processed frames, especially for inter-coding prediction mode. The artifact evaluator may also be standard compliant.

For each un-filtered reconstructed video block or frame and each filtered reconstructed video block or frame, an artifact metric may be generated to measure the amount of an artifact. The artifact metric may be a non-original reference (NR) or full-original reference (FR). The difference between an NR and FR artifact metric may be based on the availability of an original video block or frame. Artifact metric generators generate the artifact metrics and are part of an artifact evaluator. After artifact metrics are generated, a decision is made based on perceived image/video quality as to which video block or frame is used in updating an in-loop memory buffer. There are variations on how to generate an artifact metric and various ways to determine if a filtered reconstructed video block or frame or an unfiltered video block or frame is used in updating an in-loop memory buffer. These variations are illustrated in the embodiments below.

In one embodiment, an artifact metric generator is used in a video encoder to generate NR artifact metrics.

In another embodiment, an artifact metric generator is used in a video encoder to generate FR artifact metrics.

In a further embodiment, either a NR or an FR artifact metric may be used to measure the amount of blockiness.

In a further embodiment, a configurable artifact metric generator may be used to output multiple artifact metrics at once.

In even a further embodiment, a decision to determine which video block or frame should be used to update an in-loop memory buffer is based on only one type of metric, e.g., a blockiness (or-deblockiness) metric.

In another embodiment, a decision to determine which video block or frame should be used to update an in-loop memory buffer may be based on multiple types of metrics, e.g., a blockiness (or-deblockiness) metric and a blurriness metric.

Some of the embodiments described above may be combined to form other embodiments.

The details of one or more embodiments are set forth in the accompanying drawings and the description below. Other features, objects, and advantages will be apparent from the description, drawings and claims.

DETAILED DESCRIPTION

The word "exemplary" is used herein to mean "serving as an example, instance, or illustration." Any embodiment, configuration or design described herein as "exemplary" is not necessarily to be construed as preferred or advantageous over other embodiments or designs. In general, described herein, is a novel method and apparatus to not only evaluate artifacts but to improve the perceived image/video quality as a result of the evaluation.

Figure 1A:
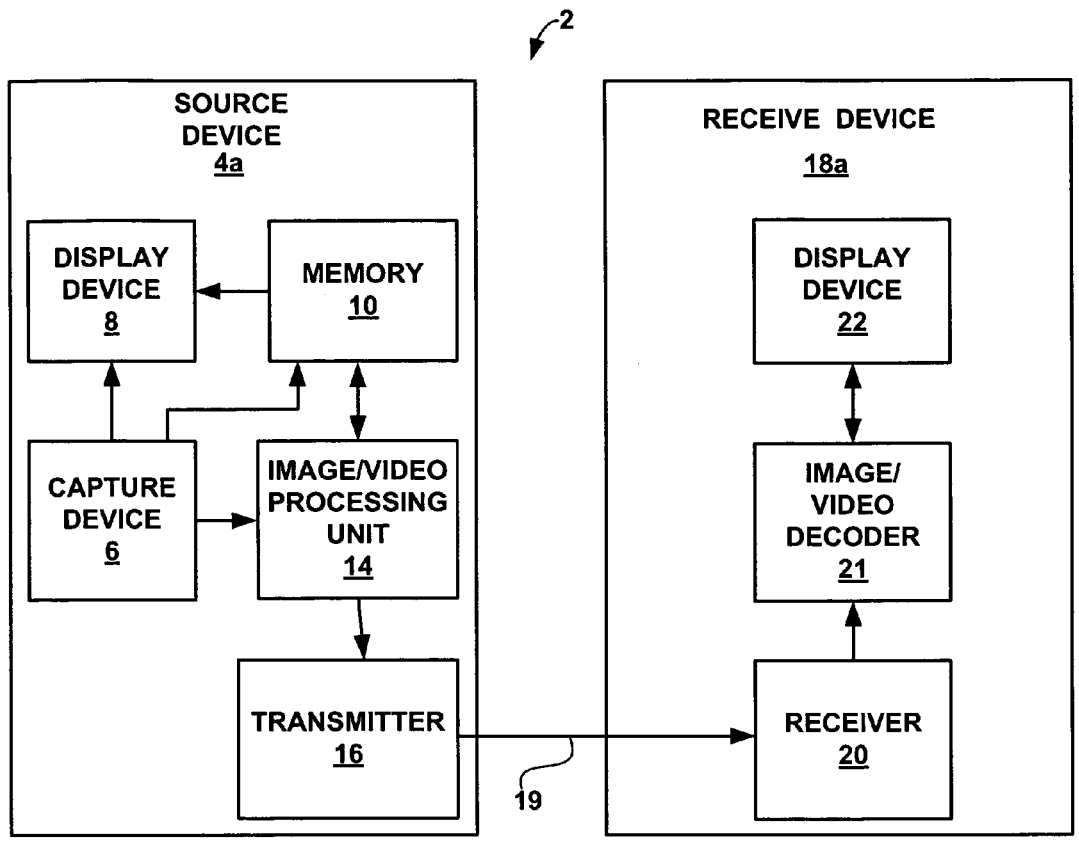
FIG. 1A illustrates an image/video encoding and decoding system employing an artifact evaluator based on techniques described herein.

FIG. 1A illustrates an image/video encoding and decoding system 2 that may employ an artifact evaluator based on techniques in accordance with an embodiment described herein. As shown in FIG. 1A, the source device 4a contains a capture device 6 that captures the video or picture input before sending the video sequence or image to display device 8. The video sequence or image may be sent to memory 10 or image/video processing unit 14. From image/video processing unit 14 the video sequence or image may also be written into memory 10. The input that image/video processing unit 14 receives from memory 10 or from capture device 6 may be sent to a image/video encoder. The image/video encoder may be inside image/video processing unit 14. The encoded bitstream output by the video encoder may be stored or sent to transmitter 16. Source device 4a transmits the encoded bitstream to receive device 18a via a channel 19. Channel 19 may be a wireless channel or a wire-line channel. The medium may be air, or any cable or link that can connect a source device to a receive device. For example, a receiver 20 may be installed in any computer, PDA, mobile phone, digital television, DVD player, image/video test equipment, etcetera, that drives an image/video decoder 21 to decode the above mentioned encoded bitstream. The output of the image/video decoder 21 may send the decoded signal to display device 22 where the decoded signal may be displayed.

Figure 1B:
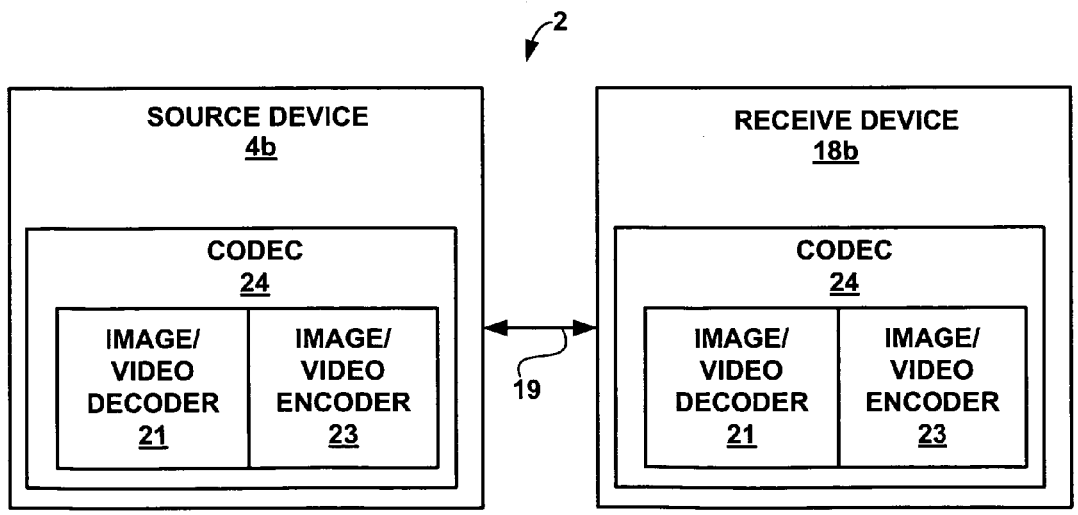
FIG. 1B illustrates two CODECs that may be used based on techniques described herein.

The source device 4a and/or the receive device 18a in whole or in part may comprise a "chip set" or "chip" for a mobile phone, including a combination of hardware, software, firmware, and/or one or more microprocessors, digital signal processors (DSPs), application specific integrated circuits (ASICs), field programmable gate arrays (FPGAs), or various combinations thereof. In addition, in another embodiment, the image/video encoding and decoding system 2 may be in one source device 4b and one receive device 18b as part of a CODEC 24. Thus, source device 4b and receive device 18b illustrate that a source and receive device may contain at least one CODEC 24 as seen in FIG. 1B. CODEC 24 is made up of image/video encoder 23 and image/video decoder 21 and may be located in an image/video processing unit 14.

Figure 2:
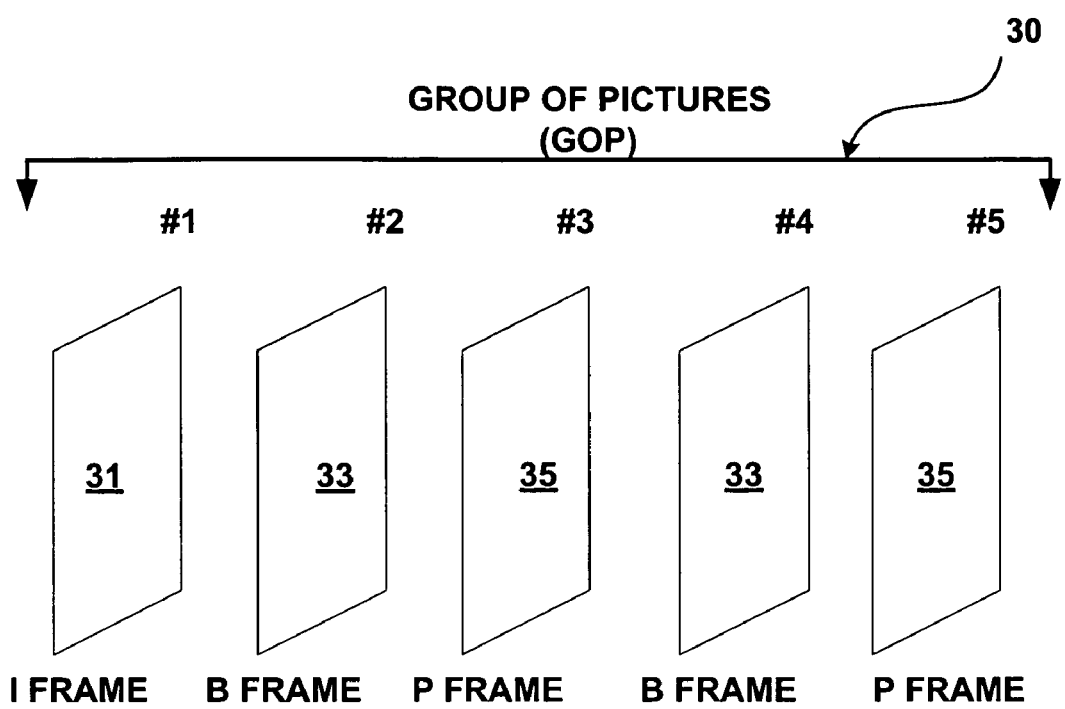
FIG. 2 illustrates a video sequence, known as a Group Of Pictures (GOP).

FIG. 2 illustrates a video sequence, known as a Group Of Pictures (GOP) 130. Inter-coding prediction mode encoding is typically used to compensate for both temporal and spatial differences between video blocks in different frames. Intra-coding prediction mode encoding is used to compensate for spatial differences between video blocks in the same frame. Both inter-coding and intra-coding modes are known as prediction modes because they use previous (or future buffered) information to aid in the current encoding of a video block. In some standards, an I-frame 31 will typically denote the first frame of a scene or a sequence of frames that is different in content than previous frames. I-frame typically uses intra-coding mode. Both B-frame(s) 33 and P-frame(s) 35 may use intra or inter coding modes. P-frame(s) 35 may use previous frames as a reference for encoding, while B-frame(s) 33 may use both previous and future frames as a reference for encoding. In the ITU H.264 standard, however, any frame (I-frame, P-frame, B-frame) may be used as a reference for encoding. Future frames may be used because frames are usually buffered and data from past or future frames in the buffer may be used for a current frame being encoded.

Figure 3:
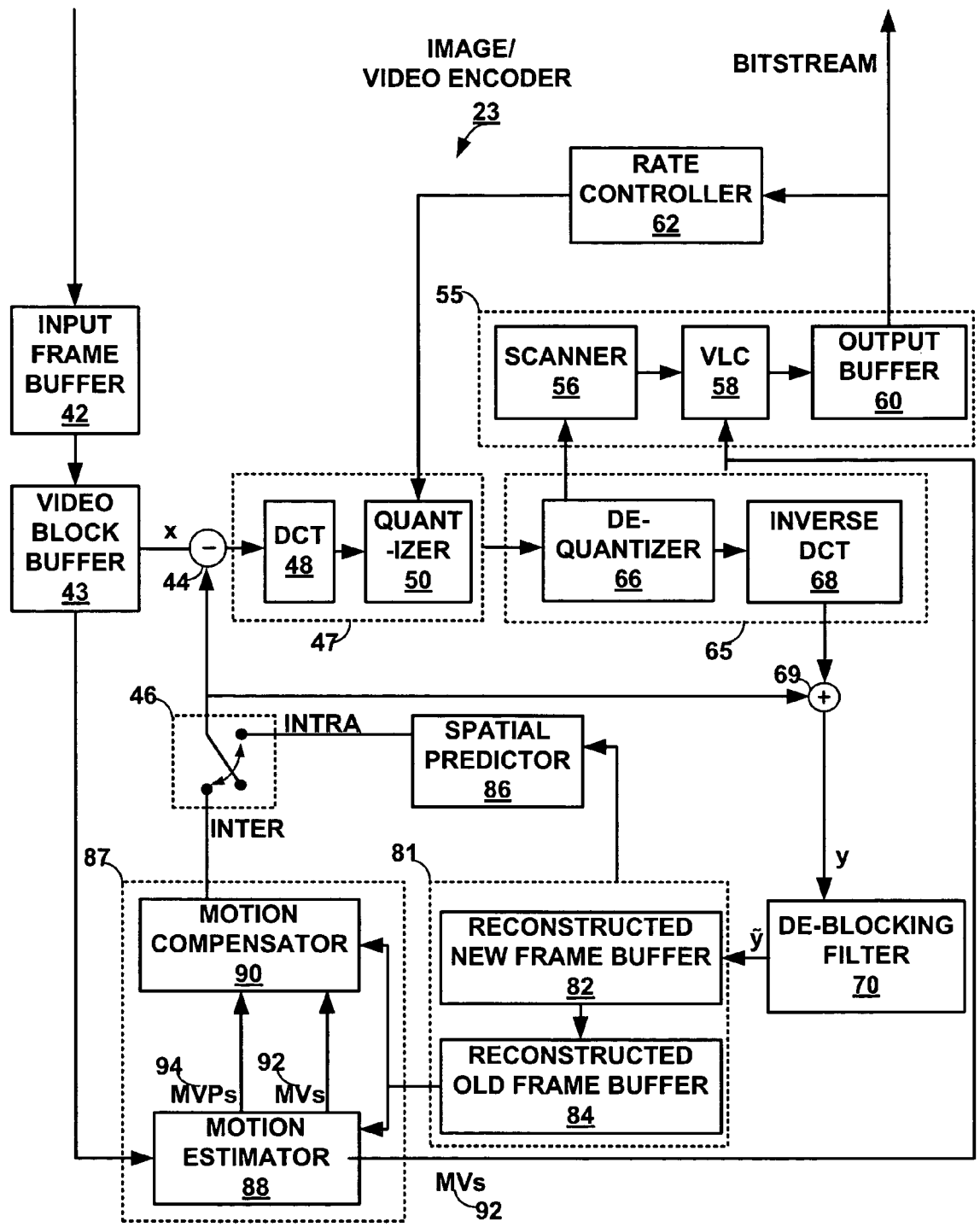
FIG. 3 illustrates an exemplary image/video encoder that may be used in a device of FIG. 1A or FIG. 1B.

FIG. 3 illustrates an exemplary image/video encoder that may be used in a device of FIG. 1A or FIG. 1B. Frames or part of frames from a video sequence may be placed in an input frame buffer 42 inside an image/video encoder 23 that may be part of CODEC 24 and/or inside image/video processing unit 14. An input frame from input frame buffer 42 may be parsed into blocks (the video blocks may be of any size, but standard square video block sizes are 4×4, 8×8, or 16×16) and sent to video block buffer 43. Video block buffer 43 typically sends a video block to subtractor 44. Subtractor 44 subtracts video block x from the output of switch 46. switch 46 may switch between intra-coding and inter-coding prediction modes of encoding If switch 46 is enabling an inter-coding prediction mode, then the resulting difference from x and a video block from a different (previous or subsequent) frame is compressed through texture encoder 47. If switch 46 enables an intra-coding prediction mode, then the resulting difference from x and predicted value from a previous video block in the same frame is compressed through texture encoder 47.

Texture encoder 47 has a DCT block 48 which transforms the input x (the video block or difference block) from the pixel domain to a spatial frequency domain. In the spatial frequency domain, data is represented by DCT block coefficients. The DCT block coefficients represent the number and degree of the spatial frequencies detected in the video block. After a DCT is computed, the DCT block coefficients may be quantized by quantizer 50, in a process is known as "block quantization." Quantization of the DCT block coefficients (coming from either the video block or difference video block) removes part of the spatial redundancy from the block. During this "block quantization" process, further spatial redundancy may sometimes be removed by comparing the quantized DCT block coefficients to a threshold. This comparison may take place inside quantizer 50 or another comparator block (not shown). If the magnitude of a quantized DCT block coefficient is less than the threshold, the coefficient is discarded or set to a zero value.

After block quantization, the resulting output may be sent to two separate structures: (1) a texture decoder 65, and (2) an entropy encoder 55. Texture decoder 65 comprises a de-quantizer 66 which aids in the production of a reconstructed image/video block or frame; to be used with a coding prediction mode. The entropy encoder 55 produces a bitstream for transmission or storage. Entropy encoder 55 may contain a scanner 56 which receives the block quantized output and re-order it for more efficient encoding by variable length coder (VLC) 58. VLC 58 may employ the use of run-length and huffman coding techniques to produce an encoded bitstream. The encoded bitstream is sent to output buffer 60. The bitstream may be sent to rate controller 62. While maintaining a base quality, rate controller 62 budgets the number of quantization bits used by quantizer 50. Entropy encoding is considered a non-lossy form of compression. Non-lossy compression signifies that the data being encoded may be identically recovered if it is decoded by an entropy decoder without the encoded data having been corrupted. Entropy encoder 55 performs non-lossy compression.

Lossy compression means that as a result of the encoding, an input, x, will not produce an identical copy of x even though the encoded input has not been corrupted. The reconstructed input has "lost" part of its information. Texture encoder 47 performs lossy compression. A typical image/video encoder 23 usually has a local texture decoder 65 to aid in the compensation of both the inter-coding and intra-coding prediction modes. de-quantizer 66, inverse DCT 68, and the output of switch 46 that is sent to adder 69 work together to decode the output of texture encoder 47 and reconstruct the input x that went into texture encoder 47. The reconstructed input, y, looks similar to x but is not exactly x. A general image/video "decoder" typically comprises the functionality of the de-quantizer 66, inverse DCT 68, and the output of switch 46 that is sent to adder 69.

In some standards, such as MPEG-4 and H.263 baseline profile, the use of a de-blockng filter 70 is not present. In MPEG-4 and H.263 baseline profile, a de-blocking filter is optional as a post-processing step in the video decoder of a receive device. Other standards, such as ITU H.264, Windows Media 9 (WM9), or Real Video 9 (RV9), support enabling the use of de-blocking filter 70, known as an "in-loop" de-blocking filter. De-blocking filter 70 is used to remove the "blockiness" that appears when the reconstructed input, y, has blocks present. As mentioned previously, in some cases, the de-blocking filter removes the blockiness but also has the effect of blurring the video frame or image. There is a tradeoff between the blockiness artifact and the blurriness artifact. Enabling de-blocking filter 70 may reduce blockiness, but it may degrade the perceived visual quality by blurring the image. The standards that enable the use of de-blocking filter 70 always update memory buffer 81 with filtered reconstructed video block or frame, ŷ. Of great benefit would be to find a way to determine when it is better to use the output of a de-blocking filter 70, or when it is better to use the input of de-blocking filter 70 to update memory buffer 81. Various embodiments in this disclosure identify and solve the limitation of previous standards. Various embodiments in this disclosure teach ways to evaluate and determine when it is better to use the output of an artifact filter such as de-blocking filter 70, or when it is better to use the input of an artifact filter such as de-blocking filter 70.

As mentioned, in some standards, when de-blocking filter 70 is enabled, the output may be sent to memory buffer 81. Inside memory buffer 81 there may be two memory buffers: (1) reconstructed new frame buffer 82; and (2) reconstructed old frame buffer 84. Reconstructed new frame buffer 82, stores the currently processed reconstructed frame (or partial frame). Reconstructed old frame buffer 84 stores a past processed reconstructed frame. The past processed reconstructed frame is used as a (reconstructed) reference frame. The reconstructed reference frame may be a frame that is before or after the current frame in input frame buffer 42. The current frame (or a video block from the current frame) or differences between the current frame and the reconstructed reference frame (or a video block from the difference block) is what is "currently" being encoded. After the current frame has finished encoding and before the next frame in input from input frame buffer 42 is fetched to be encoded, the reconstructed old frame buffer 84 is updated with a copy with the contents of the reconstructed new frame buffer 82.

Reconstructed new frame buffer 82 may send the reconstructed video block it received to be used in spatial predictor 86. Reconstructed old frame buffer 84 sends a past processed reconstructed video block to MEC (motion estimation and compensation block) 87. MEC block comprises motion estimator 88 and motion compensator 90. motion estimator 88 generates motion vectors (MV) 92 and motion vector predictors (MVP) 94 that may be used by motion compensator 90 to compensate for differences from other frames than the one being encoded. MVs 92 may also be used by entropy encoder 55. In some standards, such as ITU H.264, the output of spatial predictor 86 is used in intra-frame prediction mode and fed back both to subtractor 44 and adder 69. In some standards, such as MPEG-4 or JPEG, there is no spatial predictor 86.

Figure 4A:
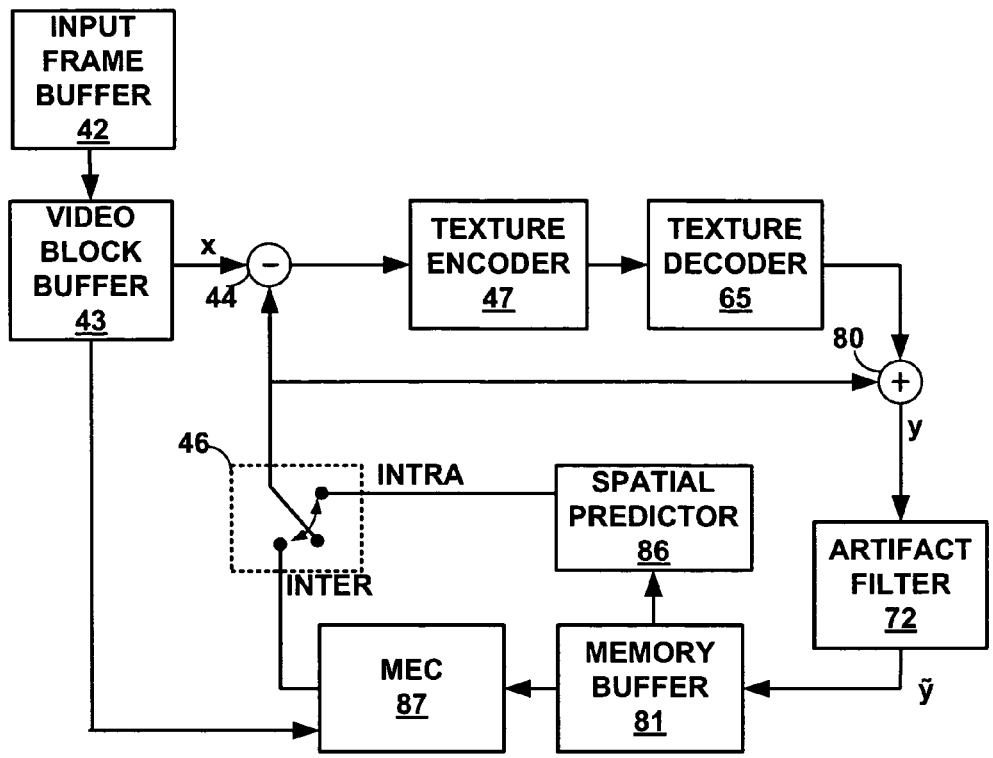
FIG. 4A illustrates a simplified exemplary image/video encoder of FIG. 3, with the de-blocking filter of FIG. 3 has been replaced with a more general artifact filter.

FIG. 4A appears similar to FIG. 3. However, only for illustrative purposes, rate controller 62 and entropy encoder 55 are omitted in FIG. 4A and subsequent figures. In addition, the de-blocking filter 70 of FIG. 3 has been replaced with a more general filter, the artifact filter 72, in FIG. 4A and subsequent figures. The intent of the replacement is to convey that a general artifact filter may be used "in-loop." As mentioned previously, artifacts may appear when reconstructing frames that have been compressed during decoding. Some examples of artifacts are blockiness, blurriness, ringing, and color bleeding blockiness is caused by independent quantization of individual video blocks. Blurriness is caused by suppression of high-frequency coefficients through coarse quantization or truncation of high frequency DCT coefficients. Blurriness may also occur through low pass filtering or smoothening. Ringing ripples along the high-contrast edge location and may be caused by quantization or truncation of high frequency coefficients. Color bleeding may occur at strongly differing chrominance area caused by the suppression of high-frequency coefficients of chroma components.

One of the most commonly used metrics to measure image and video quality is the peak signal to noise ratio (PSNR) and is defined in Equation 1 as follows:

$$PSNR(x, y) = 10 * \log_{10}\left(\frac{PKS}{(\text{coding\_error})}\right), \quad \text{(Equation 1)}$$

where PKS stands for peak pixel value squared and is usually $255^2$.

The coding_error is often computed by taking the Mean Squared Error (MSE) of the difference in pixels between a pair of video blocks. The pair may consist of a video block, x, from the original reference frame and a video block, y, from a reconstructed frame. The PSNR is a function of the coding_error between a pair of video blocks. Coding_error indicates the amount of similarity between pixels in the video blocks being compared. More similar pixels lead to a larger PSNR. A smaller PSNR means that less pixels are similar. In addition, the PSNR may also be used to indicate a measure of the average coding error. The average coding_error is denoted by <coding_error>, and may be generated by taking a running average of the coding_error. In this later case, the PSNR is a measure of the coding_error over the frame. Even though PSNR is a function of the coding_error, a smaller coding_error does not always yield good image and video quality as perceived by the user. As an example, an image of a tiled wall or floor may appear blurry after a de-blocking filer has been applied. The boundary between tiles, the edge, may only represent a small fraction of the overall image. Thus, when the coding_error is computed pixel by pixel, the resulting PSNR may indicate that the image and video quality is good even though the edges of the tiles are blurry. If the de-blocking filter is not applied to the reconstructed image, the tiles edges may appear blocky. In a case such as this, the PSNR is undesirably limiting in measuring perceived image and video quality.

The limitation of the PSNR may be overcome by a new metric, the artifact signal to noise ratio (ASNR). The ASNR metric offers a method to measure the lack (or presence) of an artifact. A version of the ASNR metric, ASNR(y or ŷ), may be generated by artifact metric generator 101 of FIG. 4B. A different version of the ASNR metric, ASNR(x, y or ŷ), may be generated by artifact metric generator 101 if the optional input x is used. Dashed lines are drawn into artifact metric generator 101 to illustrate that input x is optional. The ANSR metric may have various instantiations.

Two frameworks that may be used when measuring encoding artifacts or coding_error are: (1) non-original reference (NR); or (2) full-original reference (FR). An example of the NR framework is shown in FIG. 5A. FIG. 5A illustrates one aspect in which the artifact metric generator 101 of FIG. 4B may be used. Artifact metric generator 101a in FIG. 5A aids in the evaluation of perceived image and video quality with video blocks from only a reconstructed (REC, without an original frame) video block or frame. The non-reference frame may be any frame which is not the original frame. Typically, a video block or frame that has been compressed and reconstructed. An example of the FR framework is shown in FIG. 5B. FIG. 5B is a block diagram illustrating one aspect in which the artifact metric generator 101 with optional original input, x, of FIG. 4B may be used. Artifact metric generator 101b in FIG. 5B aids in the evaluation of perceived image and video quality with video blocks from both the original (reference) input, x, and a non-original (reconstructed) (REC, y or ŷ) video block or frame.

In general, the output of an artifact metric generator is a measure of the amount of the artifact. When the artifact is blockiness, an instantiation of the ASNR metric may be used. The instantiation is the de-blocking signal to noise ratio (DSNR) metric, which measures the lack or presence of blockiness. In an NR framework the generation performed by an artifact metric generator is only based on a reconstructed frame. If the artifact filter 72 is a de-blocking filter, the top artifact metric generator 101 in FIG. 4B may output DSNR(y) if x is not present. DSNR(y) is a measure of the amount of the blockiness of video block y, a reconstructed video block. If the artifact filter 72 is a de-blocking filter, the bottom artifact metric generator 101 in FIG. 4B may output DSNR(ŷ) if x is not present. DSNR(ŷ) is a measure of the amount of the blockiness of video block ŷ, the artifact filtered video block. DSNR(y) or DSNR(ŷ), written as DSNR(y or ŷ) are non-original reference (NR) metrics.

Figure 4B:
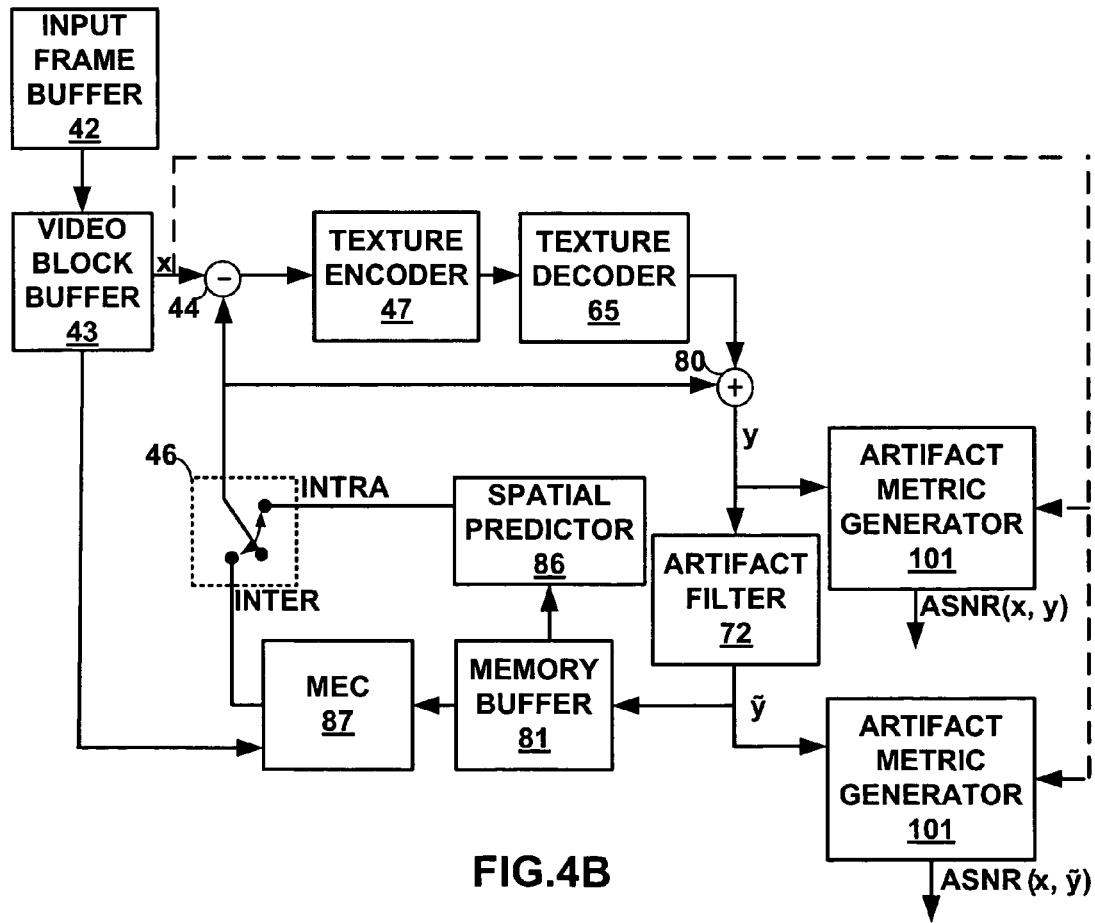
FIG. 4B illustrates the use of an artifact metric generator that aids in evaluating image and video quality with both reconstructed and optional original image/video block(s) or frame.
Figure 5A:
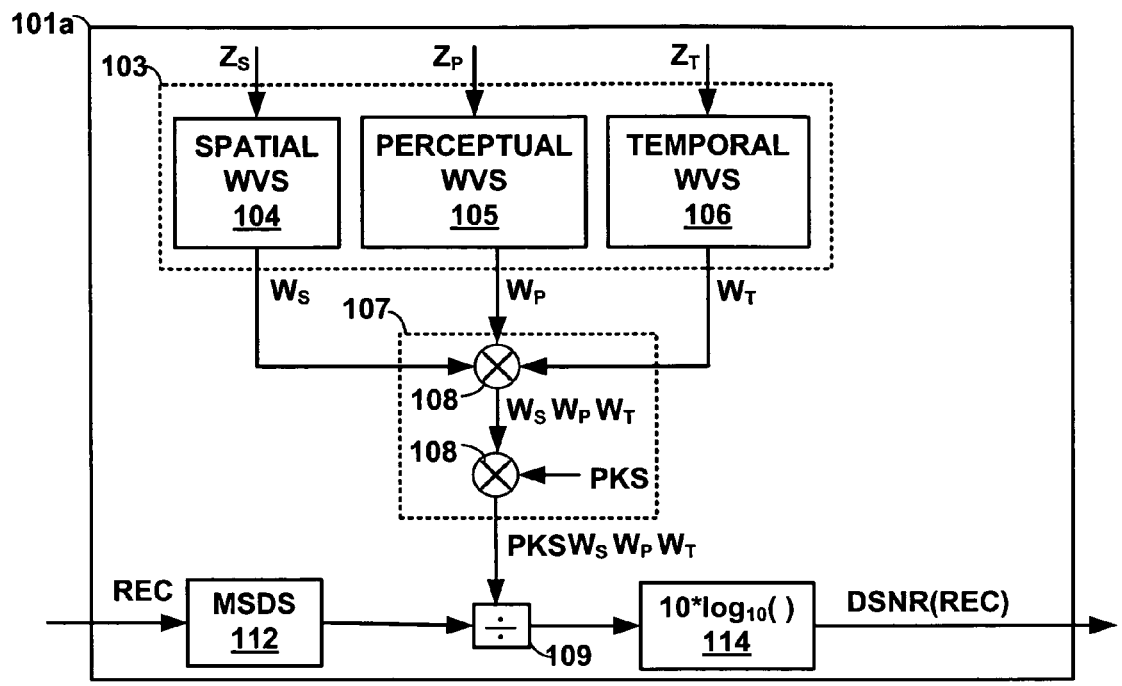
FIG. 5A illustrates one aspect of the artifact metric generator used in FIG. 4B, with only a reconstructed image/video block(s) or frame.
Figure 5B:
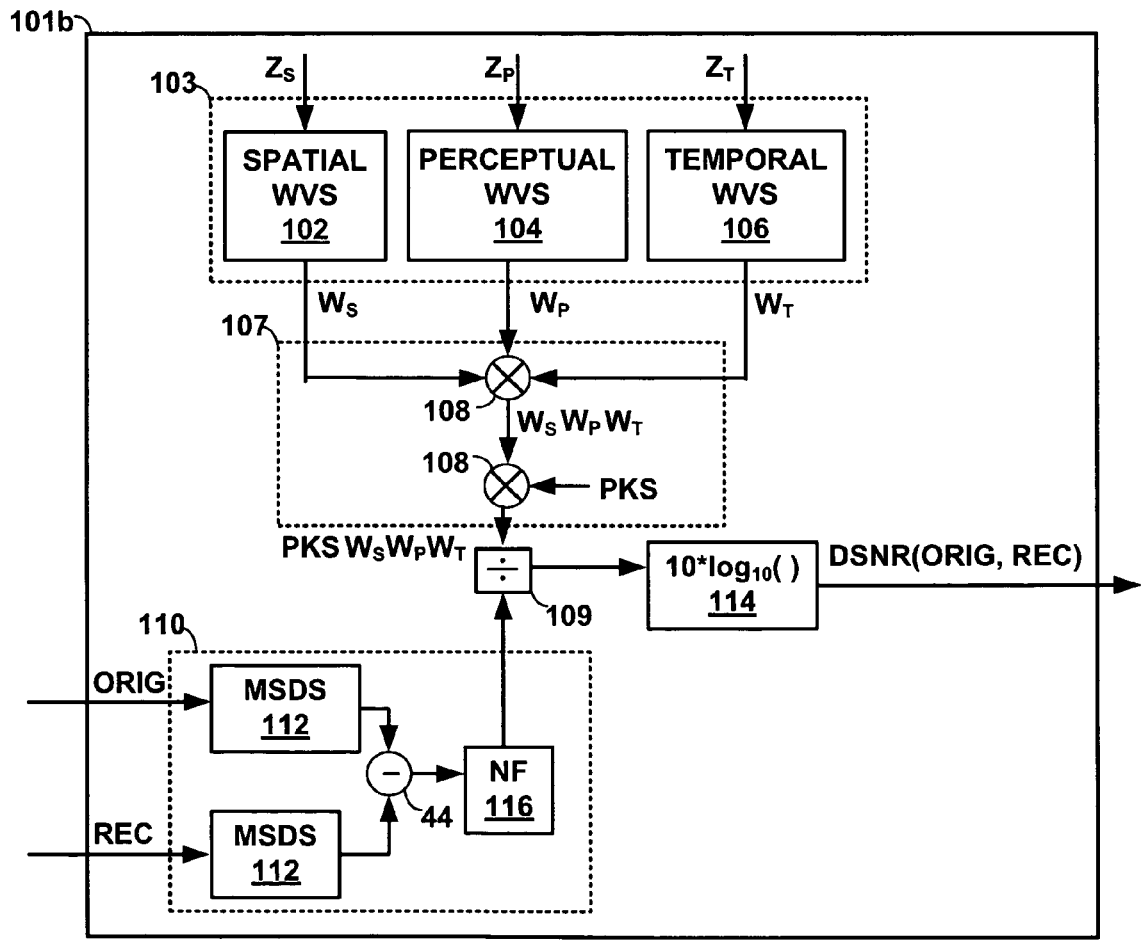
FIG. 5B is a block diagram with both reconstructed and original image/video block(s) or frame, that illustrates one aspect of the artifact metric generator used in FIG. 4B.

If the original input, x, is fed into artifact metric generator 101 in FIG. 4B, a FR framework may be used to generate a metric. The metric in an FR framework is a measure of the amount of the artifact of the non-reference frame relative to the original reference frame. If the artifact filter 72 is a de-blocking filter, the top artifact metric generator 101 in FIG. 4B may output DSNR (x, y). DSNR(x, y) is a measure of the amount of the blockiness of video block y relative to video block x. If the artifact filter 72 is a de-blocking filter, the bottom artifact metric generator 101 may output DSNR(x, ŷ). DSNR(x, ŷ) is a measure of the amount of the blockiness of video block ŷ relative to video block x. DSNR(x, y) or DSNR (x, ŷ), written as DSNR(x, y or ŷ) are full-original reference (FR) metrics.

In order to measure the amount of blockiness in an image or frame, a Mean Square Difference of Slope (MSDS) metric is sometimes used to determine the amount of blockiness in the reconstructed image or frame. However, the MSDS metric does not differentiate between blockiness in the actual texture of the original image or frame and blockiness introduced by the block quantization step of a video encoder. Moreover, the use of the MSDS metric does not exploit the use of human visual perception.

The limitation of the MSDS may be overcome by the DSNR metric. The DSNR metric may have various forms since it is used to better evaluate the image and video quality of blocked-based video encoders by accounting for the different types of blockiness and taking into account human visual perception. As mentioned, the DSNR metric is an instantiation of the ASNR metric.

A general form of the artifact signal to noise ratio (ASNR) metric is shown in Equation 2 as follows:

$$ASNR(x, y) = 10 * \log_{10}\left(\frac{PKS \cdot W_S \cdot W_P \cdot W_T}{F(x, y)}\right), \quad \text{(Equation 2)}$$

where PKS stands for peak pixel value squared and is usually $255^2$. The numerator of Equation 2 contains the product of PKS, $W_S$, $W_P$, and $W_T$. $W_S$, $W_P$, and $W_T$ are weights selected to account for the spatial ($W_S$), perceptual ($W_P$) and temporal ($W_T$) factors that affect image and video quality. The denominator of Equation 2 is F(x, y) and may be a joint or disjoint function of x and y. If x is not available, F(x, y) may be replaced by F(y). It should also be noted that y, the un-filtered reconstructed video block or frame may be replaced by ŷ, the filtered reconstructed video block or frame.

One of the functions that may be used for F(x, y) is the MSDS_error(x, y). The usage of the MSDS_error(x, y) is typically done when the DSNR metric instantiation of the ASNR metric is used. In one aspect, the MSDS_error(x, y) may be the squared error between the MSDS(x) and MSDS (y). In another aspect, the MSDS_error(x, y) may be the absolute value of the error between the MSDS(x) and MSDS (y). The MSDS_error(x, y) may have other variants, but in an FR framework, will often be a function of the error between MSDS(x) and MSDS (y). In an NR framework, the MSDS_error(x, y) may be replaced with at least two different MSDS calculations that may be compared to each other. For example, MSDS(y) and MSDS(ŷ) may be used. MSDS(x) is a function of an input video block, x, from the original reference frame. MSDS(y or ŷ) is a function of a video block, y or ŷ, from a reconstructed frame.

The Mean Square Difference of Slopes (MSDS) is often calculated at all video block boundaries, and with three different types of slopes near the boundary between a pair of adjacent video blocks. The three different types of slopes are usually calculated between pixels on the same pixel row. Consider two adjacent video blocks with L rows directly next to each other. The last two columns of pixels in the first video blocks are next to the first two columns of pixels in the second video block. A Type_1 slope is calculated between a pixel in the last column and a pixel in the penultimate column of the first video block. A Type_2 slope is calculated between a pixel in the first column and a pixel in the second column of the second video block. A Type_3 slope is calculated between a pixel in the first column of the second video block and the last column of the first video block.

Typically the MSDS is illustrated as being calculated over a common row of pixels as in Equation 3:

$$MSDS(\text{pixels}(i)) = \qquad \text{(Equation 3)}$$

$$\left[ \text{Type\_3\_slope} - \left( \frac{\text{Type\_1\_slope} + \text{Type\_2\_slope}}{2} \right) \right]^2,$$

where pixels(i) represent the ith group of pixels that is involved in the calculation in any of the L rows, in this case any ith group contains six pixels. For each video block boundary, MSDS(pixels(i)) is averaged over L rows. An overall (average) MSDS for each video block and video block boundary would be written as in Equation 4 below:

$$MSDS(b) = \frac{1}{L} \sum_{i=1}^{L} MSDS(\text{pixels}(i)), \qquad \text{(Equation 4)}$$

where L is the number of rows that defines the boundary of the video block.

However, since a column is an array of pixels, all slopes of the same type may be calculated in parallel. This parallel calculation is called a gradient. Thus, when calculating the MSDS near the boundary between a pair of adjacent video blocks, three gradients may be computed: (1) pre_gradient (for Type 1 slopes); (2) post_gradient (for Type 2 slopes); and (3) edge_gradient (for Type 3 slopes). The computed gradient is a vector. As such, parallel instances of Equation 4 may be calculated with Equation (5) below:

$$MSDS(b) = \frac{L2\_NORM \left[ \text{edge\_gradient} - \left( \frac{\text{pre\_gradient} + \text{post\_gradient}}{2} \right) \right]^2}{L}, \qquad \text{(Equation 5)}$$

where b represents any video block. MSDS(b) is calculated at the boundaries between a pair of adjacent video blocks for an ith group of pixels (i=1 ... L).

By squaring the L2 norm of the difference vector (edge_gradient-_average (pre_gradient, post_gradient)), Equation 5 may be implemented. A norm is a mathematical construct. The L2 norm is a type of norm and may be used to calculate the magnitude of a vector. To calculate the magnitude, the L2 norm takes the square root of the sum of squares of the components of a vector. Although the MSDS is often calculated as shown in Equations 4 and 5, variants may exist which do not square the difference between the edge_gradient and the average of the pre_gradient and post_gradient. For example, an L1 norm may be used instead. The embodiments enclosed herein, encompass and apply to any variant that uses Type 1, Type 2 and Type 3 slopes.

As mentioned, using the MSDS for F(x, y) yields an instantiation of the ASNR metric, the DSNR metric. Similarly, using other known metrics in place of F(x, y) may be used to yield other instantiations of the ASNR metric. The general FR form of the de-blocking signal to noise ratio (DSNR) metric is defined in Equation 6 below, $$DSNR(x, y) = 10 * \log_{10}\left( \frac{PKS \cdot W_S \cdot W_P \cdot W_T}{MSDS\_error(x, y)} \right). \qquad \text{(Equation 6)}$$

The general NR form of the DSNR metric is defined in Equation 7 below, $$DSNR(y) = 10 * \log_{10}\left( \frac{PKS \cdot W_S \cdot W_P \cdot W_T}{MSDS(y)} \right). \qquad \text{(equation 7)}$$

FIG. 5A illustrates one aspect of the artifact metric generator used in FIG. 4B, with only a reconstructed image/video block(s) or frame. Artifact metric generator 101a in FIG. 5A generates a DSNR metric without an original reference. To evaluate the de-blocking artifact, a comparison (not shown) may be done between DSNR(y) and DSNR(ŷ). The numerator of the DSNR metric shown by Equation 6 or Equation 7, may be generated in artifact metric generator 101a by using a weight value selector (WVS) Bank 103 composed of three weight value selectors: (1) spatial WVS 104 which outputs weight, $W_S$; (2) perceptual WVS 105 which outputs weight, $W_P$; and temporal WVS 106 which outputs weight, $W_T$. The weights $W_S$, $W_P$, and $W_T$, may be pre-selected or selected during the encoding process from input parameters $Z_S$, $Z_P$, and $Z_T$. The input parameters $Z_S$, $Z_P$, and $Z_T$ may be generated during the encoding process or prior to the encoder running. Numerator producer 107 computes the product of PKS, $W_S$, $W_P$, and $W_T$ seen in the numerator of Equation 6 or Equation 7. When weights $W_S$, $W_P$, and $W_T$ all equal 1, the numerator contribution of the DSNR metric is the same as the numerator of the PSNR in Equation 1. Although one multiplier 108 is sufficient in numerator producer 107, two are shown to emphasize the effect of having $W_S$, $W_P$, and $W_T$ in the numerator.

The denominator of the DSNR metric shown by Equation 7 may be carried out in artifact metric generator 101a. The input is REC (a reconstructed video block or frame), and thus F(x, y) in Equation 2 is only a function of REC, F(y or ŷ). FIG. 5A shows an example when F(y or ŷ) is MSDS(y or ŷ). The reconstructed input, REC, may be either y or ŷ, and MSDS 112 computes MSDS(y) and MSDS(ŷ) as seen in either Equation 4 or Equation 5.

Divider 109 divides the output of numerator producer 107 (PKS*$W_S$*$W_P$*$W_T$) by the output of MSDS 112, MSDS (REC (y or ŷ). Log block 114 takes 10*$\log_{10}$ of the result produced by divider 109. The output of log block 114 is the DSNR metric, which is an instantiation of ASNR(y or ŷ) computed by artifact metric generator 101.

FIG. 5B illustrates one aspect that the artifact metric generator 101 with optional original input, x, of FIG. 4B may be used. Artifact metric generator 101b has similar structure to artifact metric generator 101a, except it has a denominator producer 110 instead of just one MSDS 112. Denominator producer 110 is composed of two MSDS 112 blocks, a subtractor 44 and a norm factor 116. Denominator producer 110 receives two inputs: (1) an original input, ORIG (x); and (2) a reconstructed input, REC (y or ŷ). Subtractor 44 computes the difference between MSDS(x) and MSDS(y or ŷ) and sends the difference to norm factor 116. In one configuration of denominator producer 110, norm factor 116 may square its input. In another configuration, norm factor 116 may take an absolute value of its input. In either case, norm factor 116 may produce MSDS_error(x, y) which is output by denominator producer 110. Divider 109 divides the output of numerator producer 107 by MSDS_error(x, y), and log block 114 takes $10*\log_{10}$ of the result produced by divider 109. The output of log block 114 is DSNR(ORIG, REC), which is an instantiation of an ASNR(x, y or ỹ) metric generated by artifact metric generator 101. Each of the spatial, Perceptual, and temporal components of the DSNR metric may de-emphasize, emphasize or do nothing to the blockiness artifact being evaluated. The DSNR targets the blockiness artifact, however, the structure is such that it also affects any other artifact that is present. For example, the blurriness artifact as a result of applying the de-blocking filter also may be de-emphasized, emphasized or stay the same.

Figure 6:
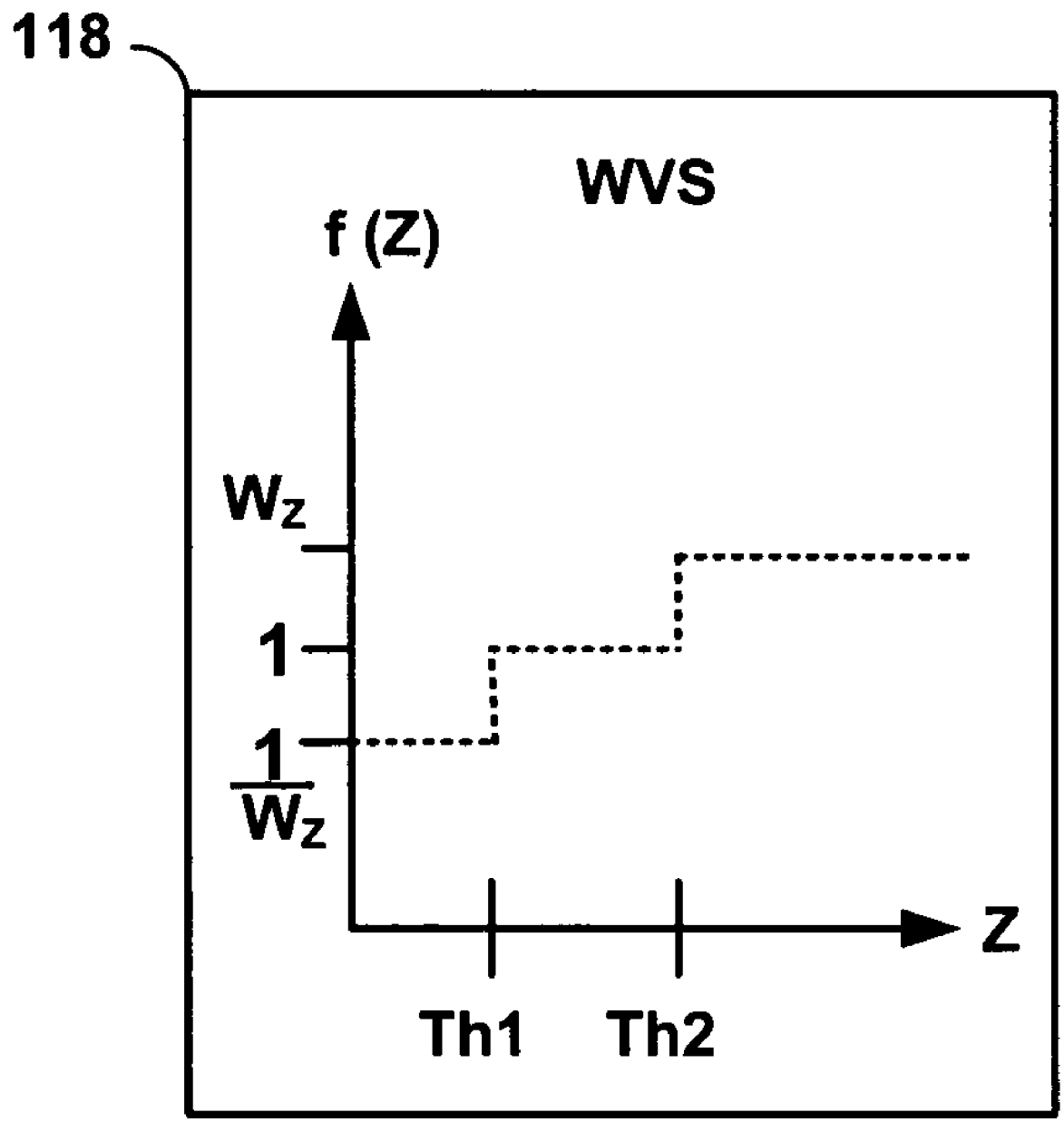
FIG. 6 is a graph that illustrates the weight value selection (WVS) used in an artifact metric generator used to compute an ASNR metric.

In general, selection process of the weights such as those in WVS bank 103 for an ASNR metric is done in such a way to improve image/video quality. For the DSNR metric, the right amount of de-blockiness is emphasized and the right amount of blurriness is de-emphasized. The selection process is based on graph 118 of FIG. 6. In FIG. 6, graph 118 illustrates the weight value selector (WVS) (spatial, perceptual, or temporal) used in an artifact evaluator. On the abscissa axis of graph 118, there are two marks: (1) Th1, which represents a Threshold 1; and (2) Th2, which represents a Threshold 2. On the ordinate axis of graph 118, the three marks represent weight values from a WVS. A generic input parameter Z ($Z_S$, $Z_P$, or $Z_T$) is generated and mapped to the abscissa (Z) axis in graph 118. Z will be in one of three ranges: (1) $0 \leq Z < Th1$; (2) $Th1 \leq Z < Th2$; and (3) $Th2 \leq Z$. Weights from a WVS are determined by the range of Z. WVS selects the weights based on the three ranges: in (1) $[W_Z]^{-1}$ is selected; in (2) 1 is selected; and in (3) $W_Z$ is selected. The $[W_Z]^{-1}$ weight may de-emphasize the spatial, perceptual or temporal component of the blockiness artifact. The weight value of 1 does not modify the blockiness artifact. The $W_Z$ weight may emphasize the spatial, Perceptual or temporal component of the blockiness artifact. This may be seen by re-writing Equation 2 as shown below:

$$ASNR(x, y) = 10*[(\log_{10}(PKS) + \log_{10}(W_S) + \log_{10}(W_P) + \log_{10}(W_T) - \log_{10}(F(x, y))]$$

Taking the logarithm of the numerator components and denominator shows that the effect of the weights is either additive, subtractive, or has no effect (when the weight value is 1).

The choice of input parameters varies. However, choices for $Z_S$, $Z_P$, and $Z_T$ may be as follows. $Z_S$ may be generated by a multi-step process explained through an example. Consider a current video block to be encoded E that has neighbors D (to its left), B (above it), and A (located near its upper left diagonal). Part of video block E and part of video block A are used to form video block AE. Similarly, video blocks BE and DE may be formed. DCT's may be computed for each of video blocks AE, BE, and DE and the average of the DCT's may be used for $Z_S$. $Z_P$ may be generated by computing an average DCT over an entire frame. $Z_T$ may be generated by computing the difference between the average DCT in one frame and the average DCT in another frame.

Figure 7:
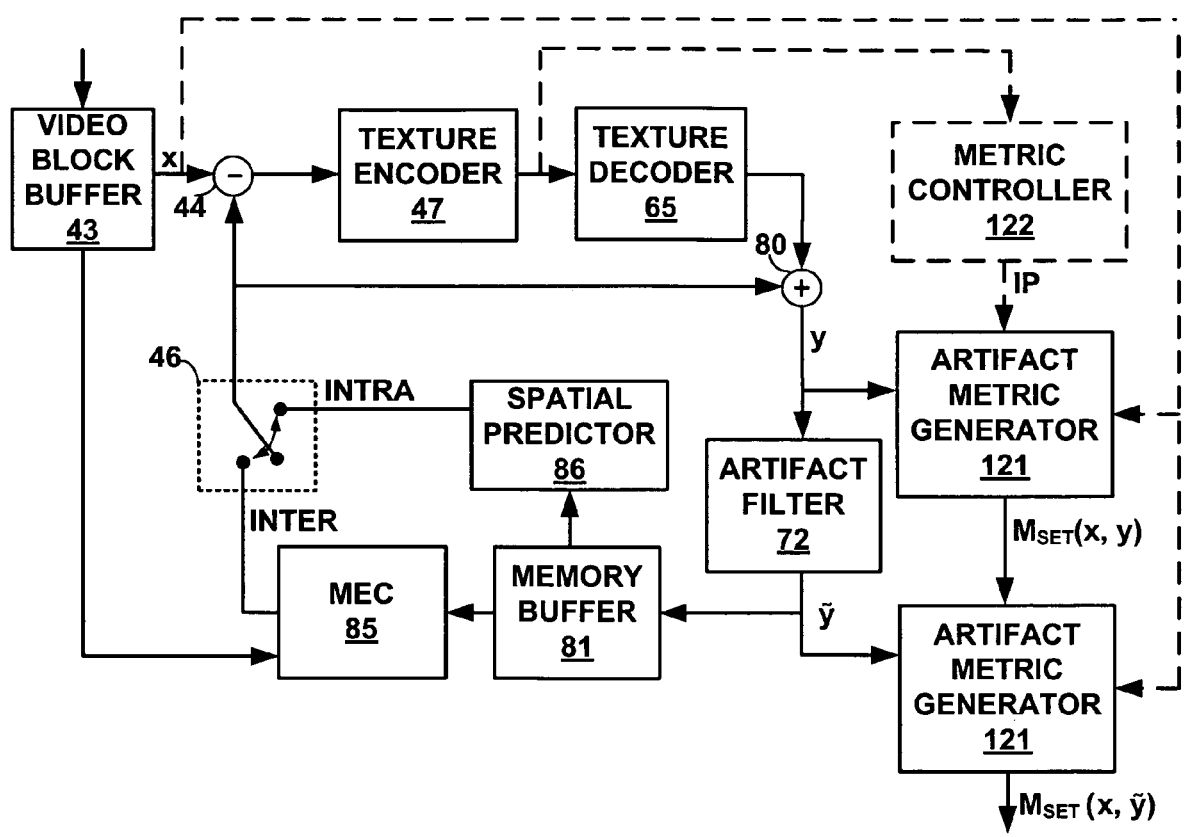
FIG. 7 illustrates an exemplary image/video encoder with a general artifact filter and more general artifact metric generator which may be configured with an optional metric controller.

FIG. 7 illustrates an exemplary image/video encoder with a general artifact filter and more general artifact metric generator 121 which may be configured with an optional metric controller 122. Metric controller 122, as well as input x, is drawn with dashed lines in FIG. 7 to show that each is optional. Artifact metric generator 121 may be pre-configured and thus would not necessarily need metric controller 122. When metric controller 122 is used, it passes input parameters to artifact metric generator 121. The input parameters may be stored in artifact metric generator 121 or passed in by metric controller 122. Artifact metric generator outputs a set of metrics, not just one output. Artifact metric generator 121 also may or may not use the original input x, when calculating the set of metrics.

Figure 8:
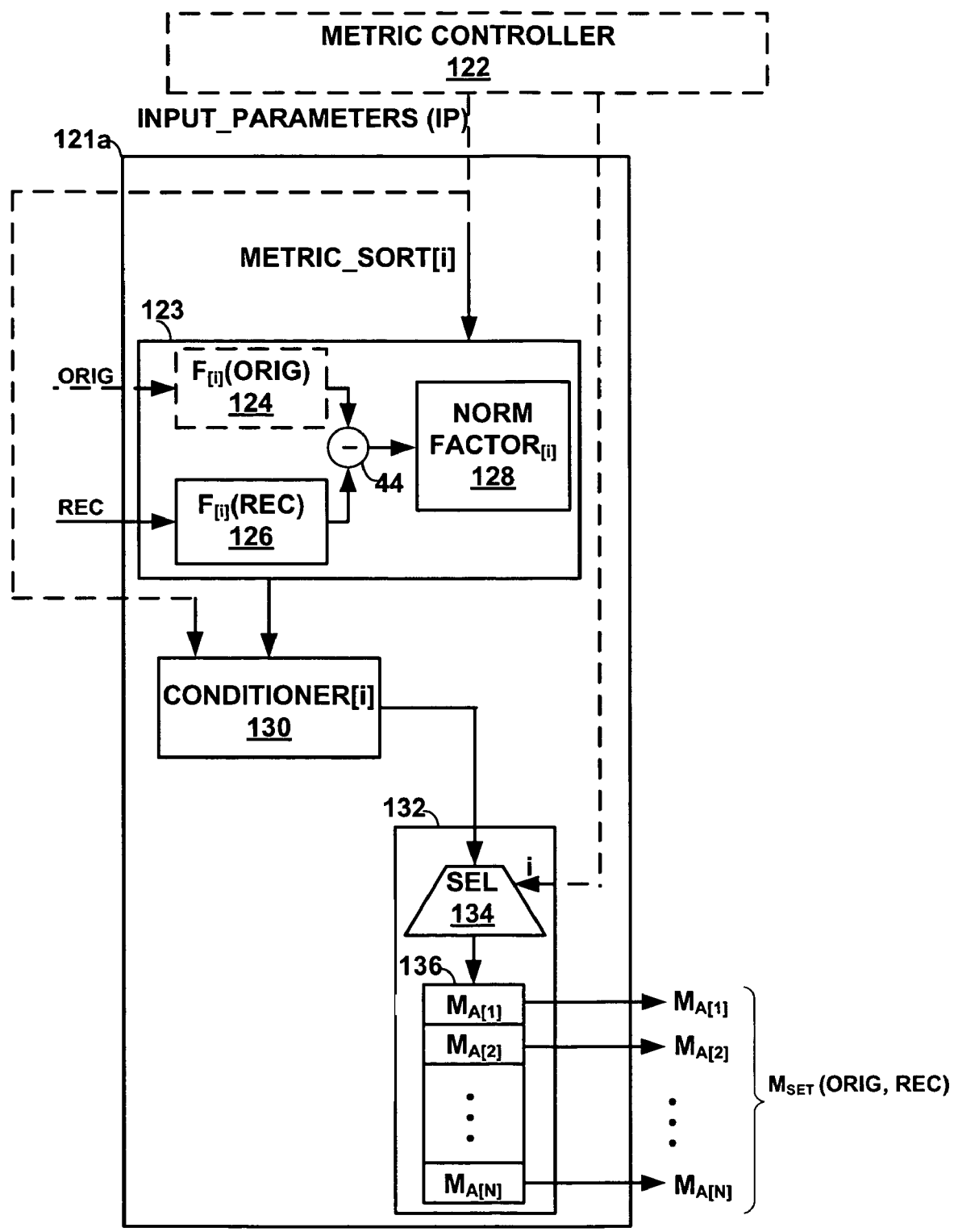
FIG. 8 illustrates a general configuration of an artifact metric generator.

FIG. 8 illustrates a general configuration of an artifact metric generator 121. The sub [i] in the component blocks is used to show two aspects in artifact metric generator 121a: (1) various metric version may be generated; and (2) entirely different metrics may be generated. From aspect (1), for example, it follows that various forms of ASNR may be generated. From aspect (2), for example, a de-blocking (or blocking) metric, a blurriness metric, a ringing metric, a color bleeding metric, or any other type of artifact metric may be generated. The general architecture is shown to capture the different metrics and various metric versions that may be possible F_err block 123 may be used to compute the error between an instance of a function of the original video block or frame and an instance of a function of a reconstructed video block or frame. The difference between the functions is computed by subtractor 44 and norm factor (NF) 128 can be selected for a particular choice of F. Artifact metric generator 121 may implement the functions of artifact metric generator 101. This may be seen by recognizing that in the architecture of artifact metric generator 101a of FIG. 5A the choice of F was MSDS (y) and MSDS(ỹ). In the architecture of artifact metric generator 101b of FIG. 5B, the choice of F was a function of MSDS(x, y) and MSDS(x, ỹ). The choice of F may be controlled through METRIC_SORT[i] which may be pre-configured or sent by metric controller 122. Conditioner[i] 130 may be used for any set of operations on the output of F_err block 123, including multiplying by 1. Conditioner[i] 130 "conditions" the output of F_err block 123. The output of conditioner[i] 130 may be sent to metric arranger 132. Metric arranger 132 uses Selector 134 to route the various metric or metric versions into metric buffer 136. Selector 134 may be internally driven or optionally may be controlled via metric controller 122. The output $M_{SET}$(ORIG, REC) is a set of outputs, $M_{A[1]}$, $M_{A[2]}$, ... $M_{A[N]}$. Each member of $M_{SET}$ (ORIG, REC) may be a different metric or various metric version. From FIG. 8, shows that the general form of the ASNR metric may be conditioner(F(x, y)), i.e., F(x, y) may be conditioned by some other function or sets of functions. In Equation 2, the conditioner is $10*\log 10 PKS*W_S*W_P*W_T$).

Figure 9:
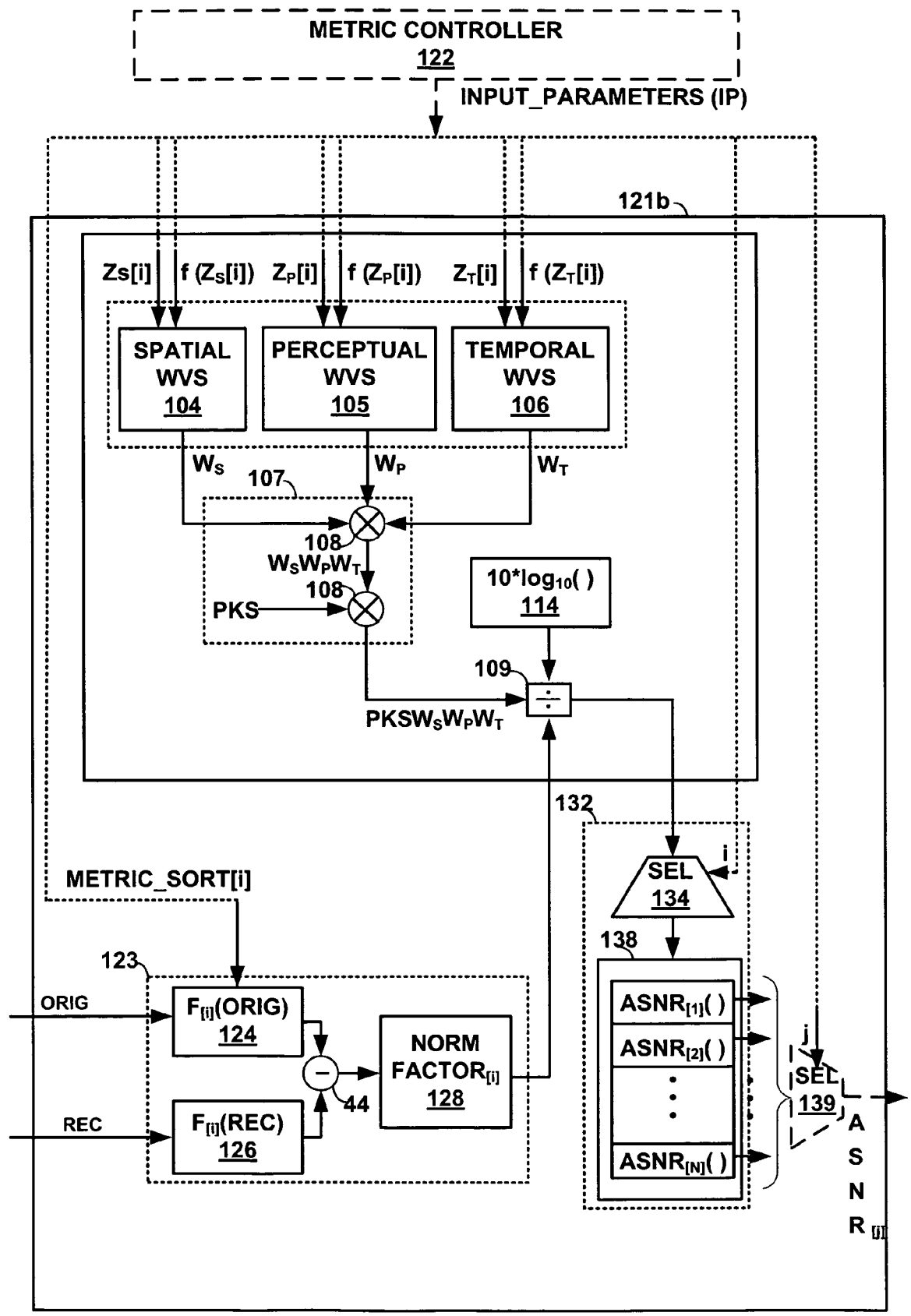
FIG. 9 illustrates that the artifact metric generator of FIG. 8 may be configured to implement different versions of an ASNR metric.

FIG. 9 illustrates that the artifact metric generator 121a of FIG. 8 may be configured to implement various versions of an ASNR. There is an additional optional selector 139 that may be used to select which version of ASNR may be output. The optional selector 139 is used to show that the artifact metric generator 121b of FIG. 9 may be configured to function like an artifact metric generator 101 (only one ASNR output). If the optional selector 139 is not used, the output of artifact metric generator 121b may be $ASNR_{SET}$(ORIG, REC). As mentioned previously, F_err block 123 may implement MSDS(x, y) and MSDS(x, ỹ). FIG. 9 also shows conditioner [i] 130. Conditioner[i] 130 may implement the numerator of Equation 2 along with division and taking the log of the division. Metric controller 122 may send different input parameters that result in different versions of conditioner[i] 130. Alternatively, METRIC_SORT[i] may choose different functions other than the MSDS. Other norm factor(s) [i] 128 may also be chosen as well. In the configuration of FIG. 9, the general output $ASNR_{SET}$ (ORIG, REC) is $ASNR_{[1]}$, $ASNR_{[2]}$, ... $ASNR_{[N]}$, and one of these may be optionally selected by selector 139 to be output.

Since artifacts may affect image and video quality, a way to use the metrics to aid in evaluating perceived image and video quality during the encoding process is desired. The use of artifact evaluator 140 in FIG. 10 permits such a way. Artifact evaluator 140 may evaluate which reconstructed input has a better perceived image and video quality. Typically, during the encoding process, memory buffer 81 is updated with either one of two choices. The choice is typically between the un-filtered reconstructed video block (or frame) y, or the (de-blocked) filtered reconstructed video block (or frame) ỹ. Under lower bit conditions, blockiness is sometimes a dominant artifact. As such, artifact filter 72 may be typically configured to diminish blockiness. In doing so, the filtered reconstructed video block (or frame) ỹ may be too blurry. If ỹ is too blurry, then updating memory buffer 81 with ỹ will result in blurry edges. If y is too blocky, updating memory buffer 81 with y will result in "blockiness." If the current encoding methods and standards use de-blocking filter 70, they always update memory buffer 81 with the output of the de-blocking filter 70. Current encoding methods and standards are limited because they do not have a way to "adaptively" change how memory buffer 81 is updated. Because of this limitation in current encoding methods and standards, poor image/video quality is propagated to other frames, especially for inter-coding prediction mode.

Figure 10:
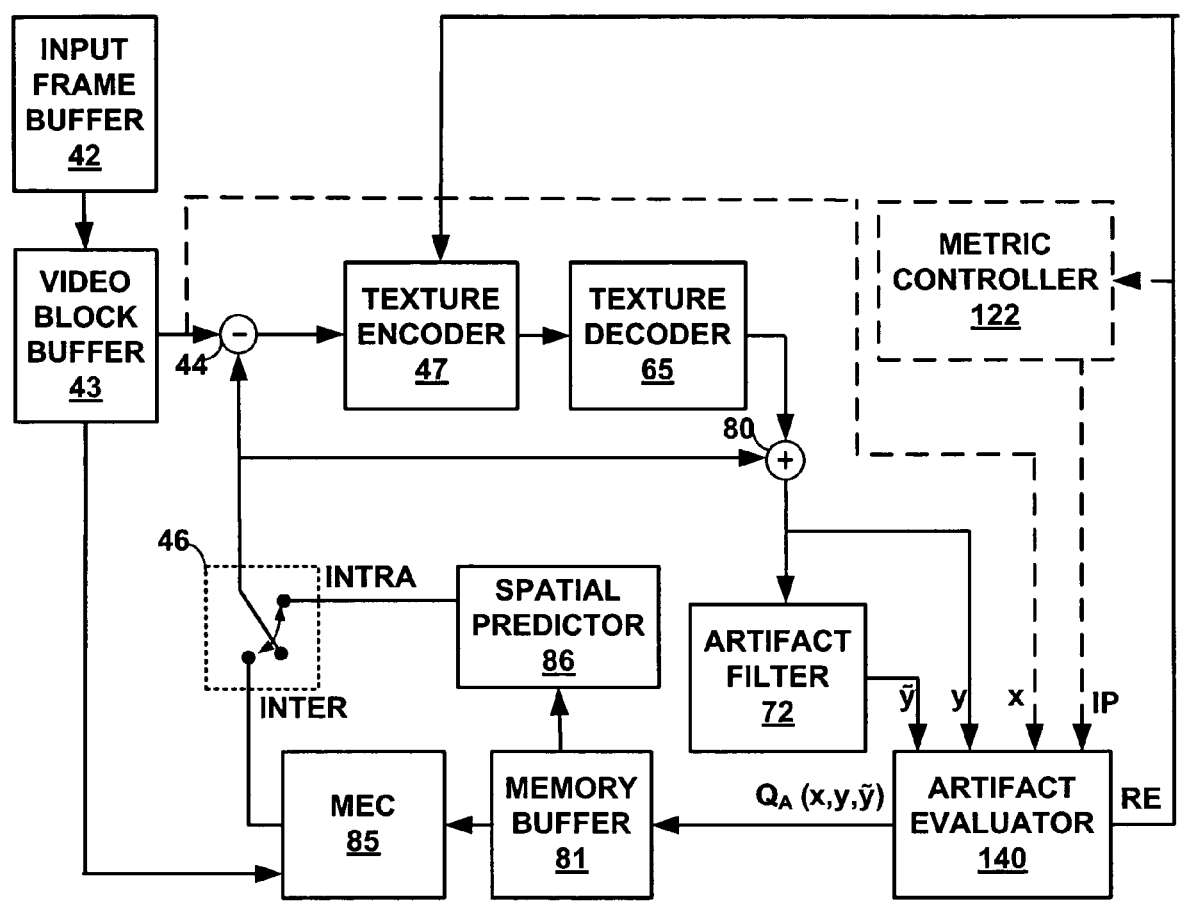
FIG. 10 illustrates that an artifact evaluator may be used in a feedback loop of a typical-image/video encoder.

Using the artifact evaluator of FIG. 10 "in-loop", i.e., the feedback loop of an image/video encoder allows an "adaptive" way to change how memory buffer 81 is updated. Adaptively means that the image/video encoder can adjust the input into memory buffer 81 depending on what reconstructed video block (or frame) has a better perceived visual quality, y or ỹ. Artifact evaluator 140 evaluates which image and video quality is better, y or ỹ. If the quality of y is better, artifact evaluator 140 may set the output $Q_A$ (x, y, ỹ) to y and update memory buffer 81 with y. If the quality of ỹ is better, artifact evaluator 140 may set the output $Q_A$ (x, y, ỹ) to ỹ and update memory buffer 81 with ỹ. If the image and video quality of both y and ỹ is not of acceptable image and video quality, then artifact evaluator 140 may instruct image/video encoder 23 to re-encode with a different set of quantization coefficients. As such, the image and video quality evaluated by artifact evaluator 140 may be adaptively improved immediately after the encoding and reconstruction of any video block in a frame. Thus, use of an artifact evaluator 140 overcomes the limitations of the current encoding methods and standards. The architecture seen in FIG. 10 through the use of an artifact evaluator 140 not only enhances the image/video quality of current methods and standards, but it also offers an additional advantage of preventing poor image/video quality propagation to sub-sequent processed frames, especially for inter-coding prediction mode.

In addition, since some standards, such as ITU H.264, WM9, and RV9 support the use of de-blocking filters, the use of artifact evaluator 140 is standard compliant. For example, the decision of which reconstructed (filtered or un-filtered) video block or frame in the encoder was used to update memory buffer 81 may be passed to the video decoder. Thus, for a video encoder and video decoder to be "in-sync" the decision may be inserted into a video decoders' header information, i.e., it can be inserted as part of the bitstream that tells the video decoder if the de-blocking filter is on or off.

Figure 11A:
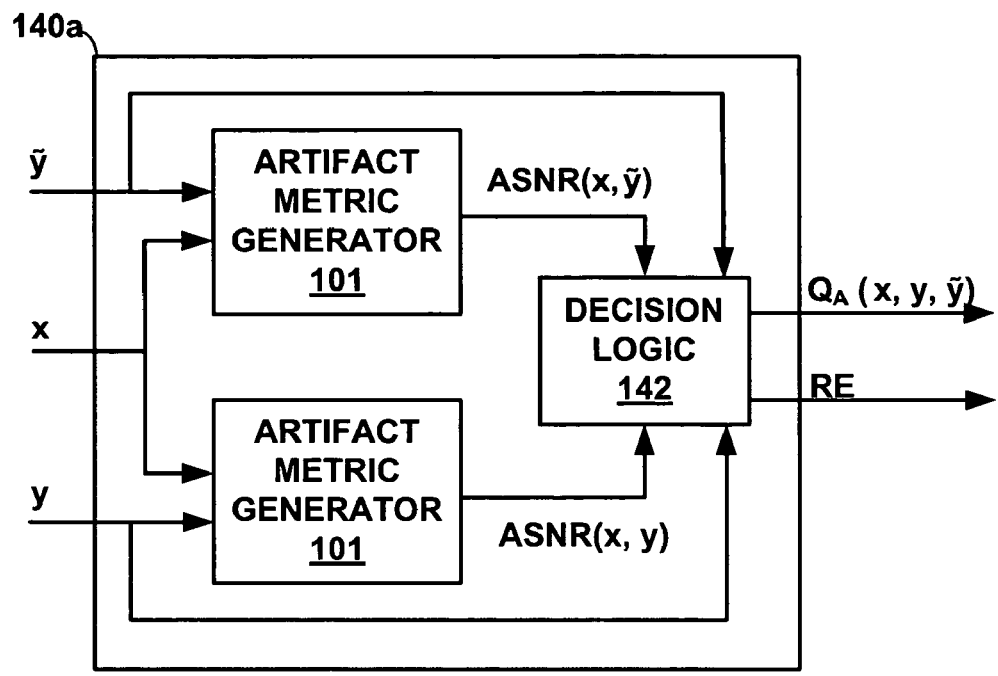
FIG. 11a illustrates a version of an artifact evaluator which uses one type of metric to make an output decision.

FIG. 11A illustrates a version of an artifact evaluator 101 that uses one type of metric to make an output decision. FIG. 11A illustrates a configuration of the artifact evaluator 140 used in FIG. 10. Artifact evaluator 140 receives two inputs, y, and ỹ, and alternatively receives inputs x and input parameters (IP) from metric controller 122. The input parameters (IP) for artifact evaluator 140a from metric controller 122 may be pre-configured, i.e., direct input from metric controller 122 is not needed. As such, the input parameters from metric controller 122 are omitted in FIG. 11A. Artifact evaluator 140 directs inputs, x (if received) and y into an artifact metric generator 101 and also directs inputs x (if received) and y into a different artifact metric generator 101. An embodiment of the structure of artifact metric generator 101 is shown in both FIG. 5A and FIG. 5B and its function was discussed above, either may be used. In FIG. 11A top artifact metric generator 101 outputs ASNR(x, ỹ) (although ASNR(ỹ) may alternately be used) and the bottom artifact evaluator 101 outputs ASNR(x, y) (although ASNR(y) may alternately be used). Decision logic 142 receives ASNR(x, ỹ) and ASNR(x, y) and decides to output y or ỹ, or activates line output RE to re-encode, based on the two input ASNR metrics. It may be recognized that the logic illustrated in FIG. 11A may be used for any ASNR metric, not just the DSNR metric.

Figure 11B:
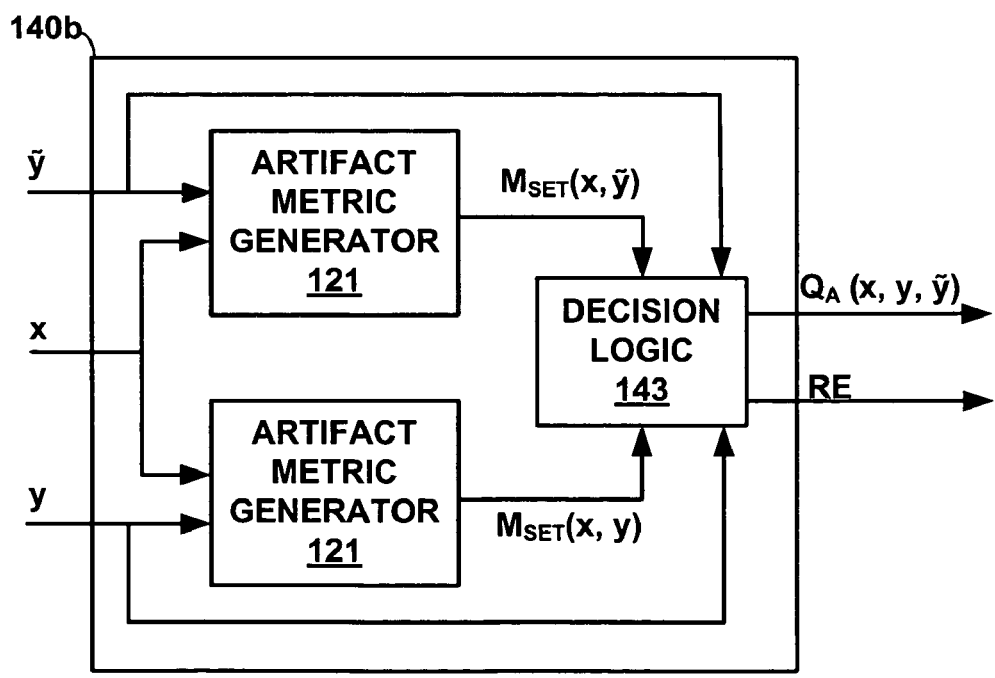
FIG. 11b illustrates a version of an artifact evaluator which uses multiple types of metrics to make an output decision.

FIG. 11B illustrates a version of an artifact evaluator 121 which uses multiple metrics or metric versions to make an output decision. FIG. 11B illustrates a configuration of the artifact evaluator 140 used in FIG. 10. Artifact evaluator 140 receives two inputs, y, and ỹ, and alternatively receives inputs x and input parameters (IP) from metric controller 122. The input parameters (IP) for artifact evaluator 140b from metric controller 122 may be pre-configured, i.e., direct input from metric controller 122 is not needed. As such, the input parameters from metric controller 122 are omitted in FIG. 11B. Artifact evaluator 140 directs inputs, x (if received) and y into an artifact metric generator 121 and also directs inputs x (if received) and ỹ into a different artifact metric generator 121. A structure of artifact metric generator 121 is shown in both FIG. 8 and FIG. 9 and its function was discussed above, either may be used. In FIG. 11B, top artifact metric generator 121 outputs $M_{SET}$(x, ỹ) (although $M_{SET}$(ỹ) may alternately be used) and the bottom artifact evaluator 121 outputs $M_{SET}$(x, y) (although $M_{SET}$(y) may alternately be used). Decision logic 143 receives $M_{SET}$(x, ỹ) and $M_{SET}$(x, y) and decides to output y or ỹ, or activates line output RE to re-encode, based on the two input sets of metrics.

Figure 12:
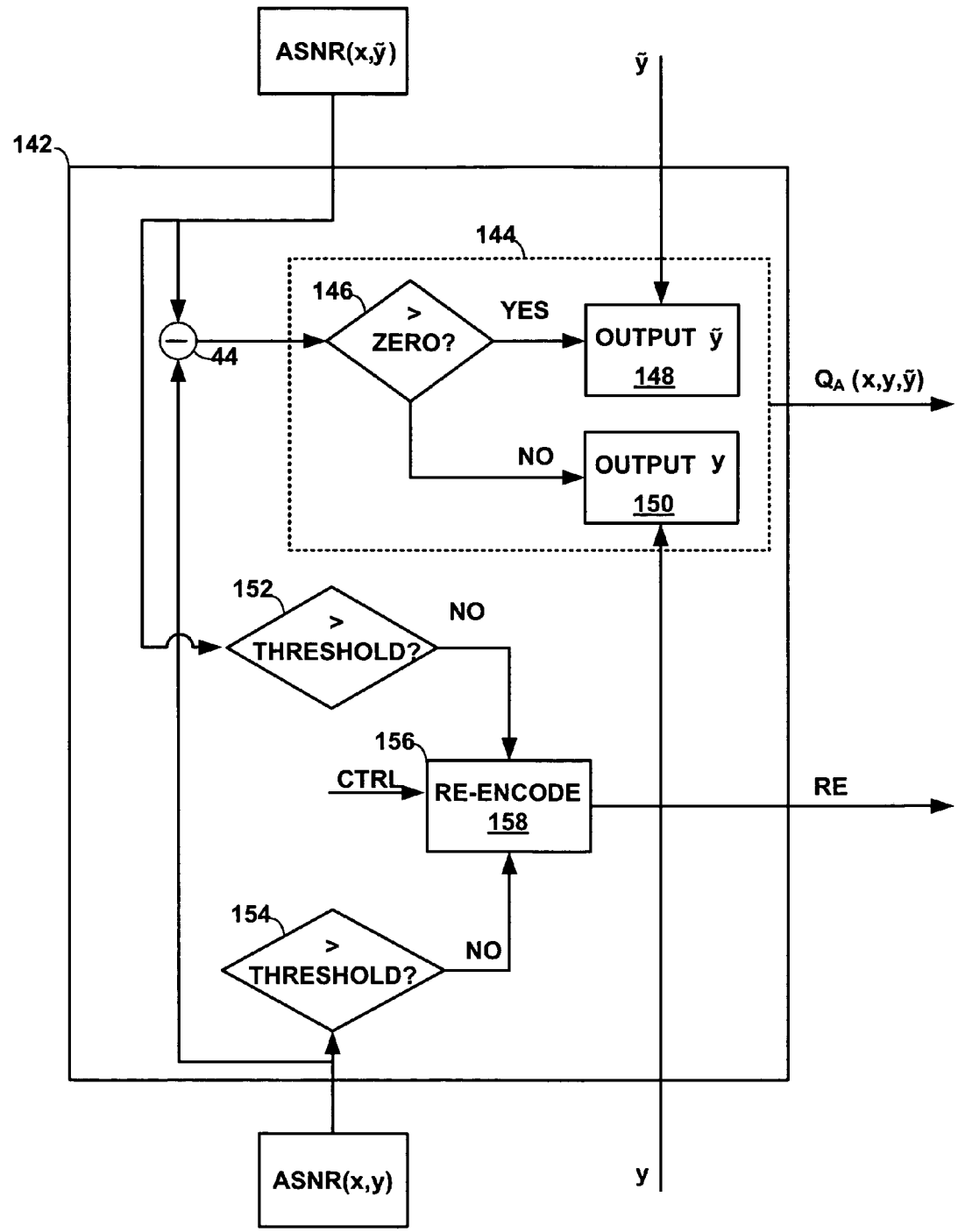
FIG. 12 illustrates a flowchart of a method used by decision logic block in FIG. 11A.

FIG. 12 illustrates a flowchart of a method used by decision logic 142 block in FIG. 11A. Subtractor 44 subtracts ASNR metric inputs, ASNR(x, ỹ) and ASNR(x, y), and the resulting difference is sent to output quality 144 block. Inside output quality 144 block, the difference is compared to zero 146. If the difference is greater than zero this means: (1) ASNR(x, ỹ)>ASNR(x, y) and the output 148 is ỹ; and (2) ASNR(x, ỹ)>acceptable threshold of image and video quality. If the difference is less than zero then: (1) ASNR(x, y)>ASNR(x, ỹ) and the output 150 is y; and (2) ASNR(x, y)>acceptable threshold of image and video quality. If a control (CTRL) signal is enabled, an output (RE) of Decision logic 142 block may instruct image/video encoder 23 to re-encode x. This may be possible if both ASNR(x, y) and ASNR(x, y) are less than an acceptable threshold of image and video quality. The output $Q_A$ (x, y, ỹ) is used to update the encoder memory buffer (see FIG. 10). It may be recognized that the logic illustrated in the flowchart of FIG. 12 may be used for any ASNR metric, not just the DSNR metric.

Figure 13:
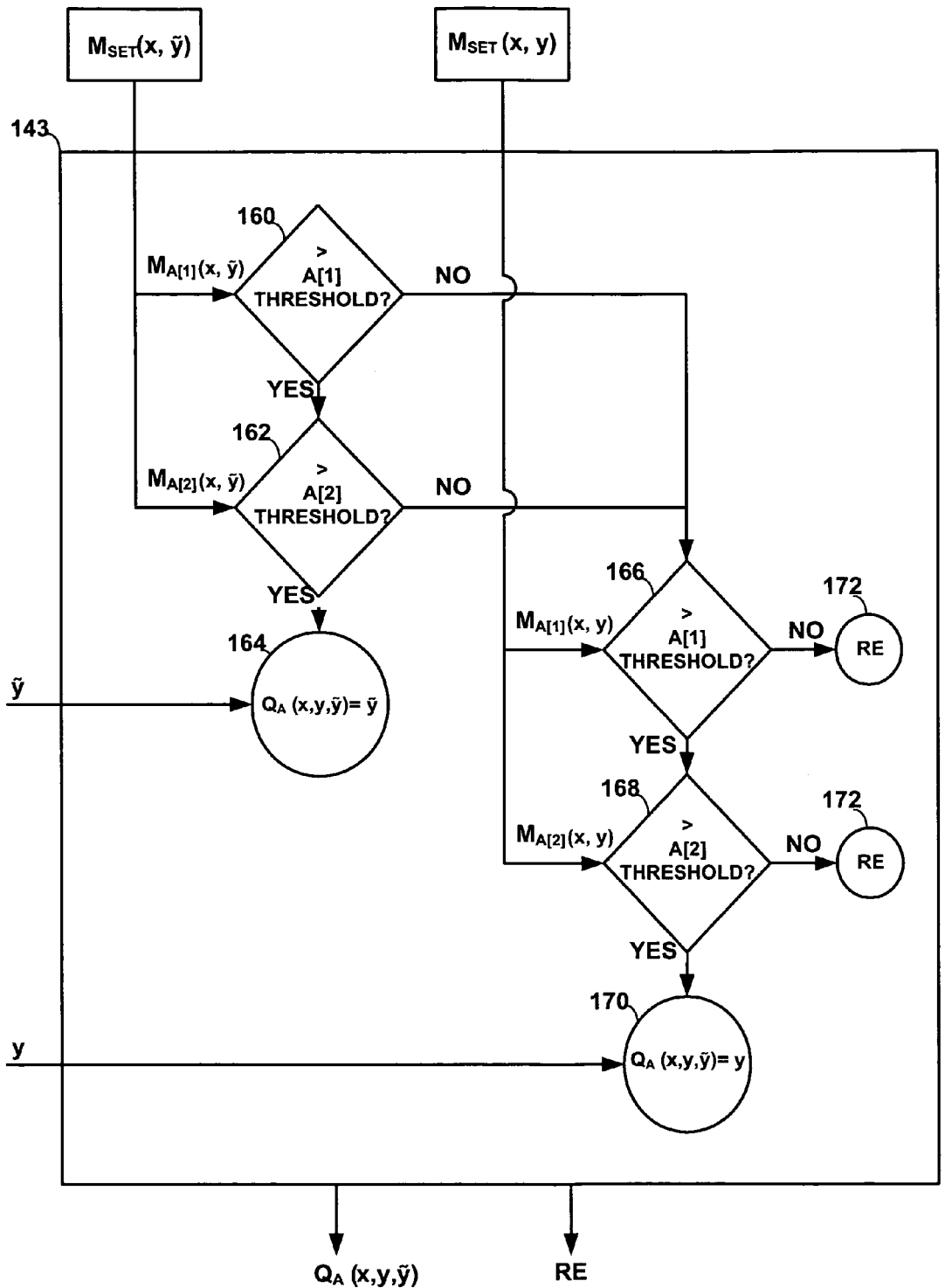
FIG. 13 illustrates a flowchart of a method used by decision logic block in FIG. 11B.

FIG. 13 illustrates a flowchart of a method used by decision logic 143 in FIG. 11B. The flowchart represents a decision logic for any artifact metric or variant of an artifact metric. For example, A[1] may be blockiness, and $M_{A[1]}$(x, ỹ) may be DSNR(x, ỹ). Similarly, A[2] may be blurriness and $M_{A[2]}$(x, ỹ) may be a metric that measures the amount of blurriness of ỹ. Similarly, $M_{A[1]}$(x, ỹ) may be DSNR(x, y) and $M_{A[2]}$(x, y) may be a metric that measures the amount of blurriness of y. $M_{A[2]}$ (x, y or ỹ) may be another version of DSNR which de-emphasizes blockiness and as such emphasizes blurriness more in relation to $M_{A[1]}(x, y\text{ or }\tilde{y})$. $M_{A[2]}(x, y\text{ or }\tilde{y})$ may also be a metric that measures the amount of blurriness.

A comparison 160 between $M_{A[1]}(x, \tilde{y})$ and a blockiness threshold is made to check the amount of blockiness present in filtered reconstructed video block(or frame) $\tilde{y}$. If the comparison 160 is true (YES), then $\tilde{y}$ meets an "acceptable" perceived image and video quality. A further comparison 162 between $M_{A[2]}(x, \tilde{y})$ and a blurriness threshold is made to check the amount of blurriness present in $\tilde{y}$. If the comparison 162 is true (YES) then $\tilde{y}$ meets an "acceptable" perceived image and video quality for both blurriness and blockiness. The resulting output $Q_A(x, y, \tilde{y})$ becomes 164 $\tilde{y}$ and the encoder memory buffer (see FIG. 10) gets updated with $\tilde{y}$.

If either comparison 160 or 162 is false (NO), then a comparison 166 between $M_{A[1]}(x, y)$ and a blurriness threshold is made to check the amount of blurriness present in un-filtered reconstructed video block(or frame) y. If the comparison 166 is true (YES), then y meets an "acceptable" perceived image and video quality. A further comparison 168 between $M_{A[2]}(x, y)$ and a blurriness threshold is made to check the amount of blurriness present in y. If the comparison 168 is true (YES), then y meets an "acceptable" perceived image and video quality for both blurriness and blockiness. The resulting output $Q_A(x, y, \tilde{y})$ becomes 170 y, and the encoder memory buffer (see FIG. 10) gets updated with $\tilde{y}$. If either comparison 166 or 168 is false (NO), then the line output RE becomes active 172, and a re-encode of the original video block (or frame) x may take place.

Figure 14:
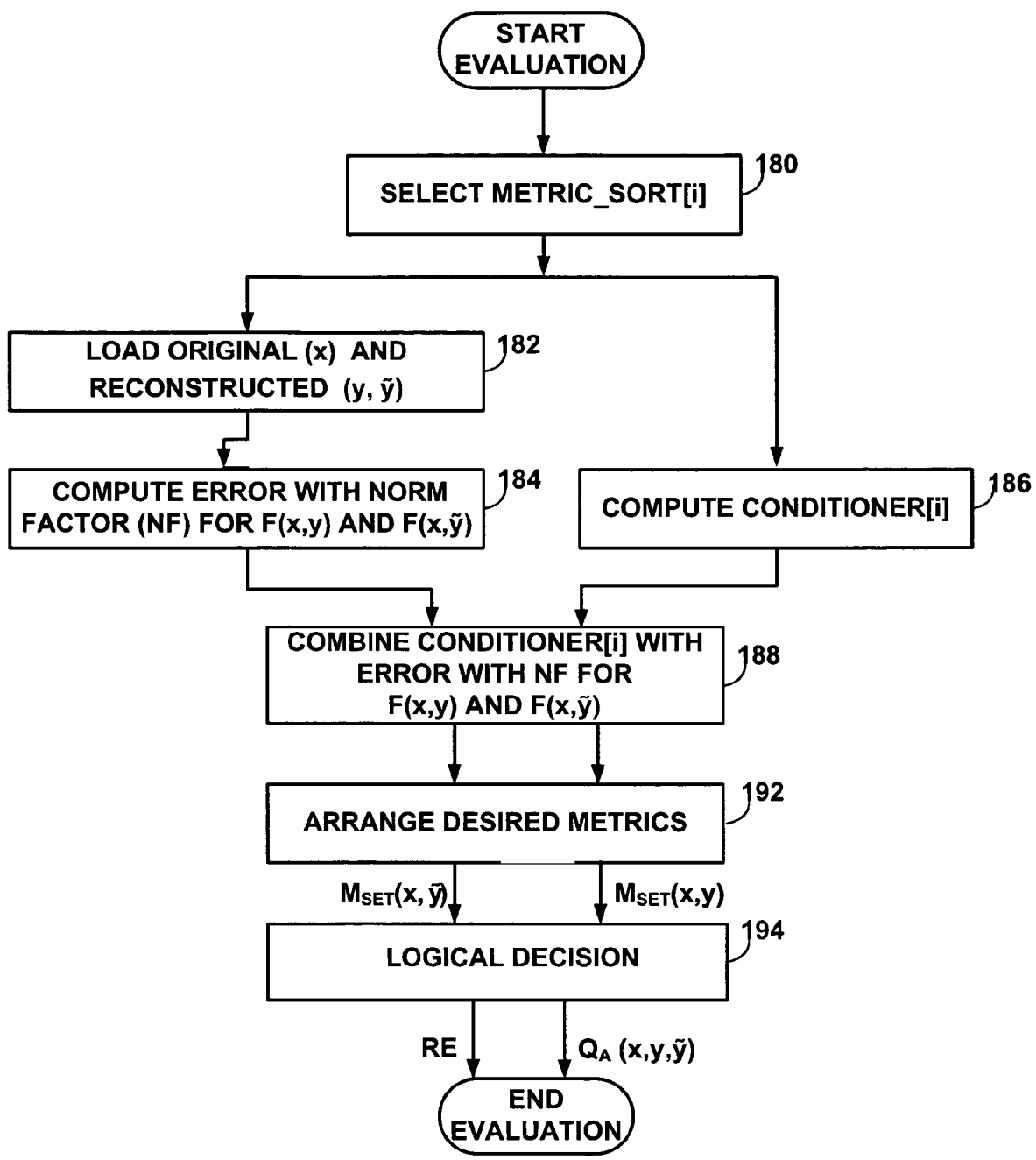
FIG. 14 illustrates a flowchart of the artifact evaluation process.

FIG. 14 illustrates a flowchart of the artifact evaluation process. After an artifact evaluation starts, selection of metric_sort 180 is based on what type or version of metric will be generated. Loading of an original x video block or frame (if one is available) and loading of the available reconstructed y or $\tilde{y}$ video block(s) or frame(s) 182 takes place. Error(s) may be computed with functions, F, and/or norm factors (NF) 184. conditioner[i] may be done prior or during (serial or parallel) to encoding 186. Combination of conditioner[i] with the result of the Error(s) computed with functions F, and/or NF 188 may then be executed. The resulting combination(s) result in two $M_{SET}$ metrics result, $M_{SET}(x, y)$ and $M_{SET}(x, \tilde{y})$. Each member of $M_{SET}(x, y)$ and $M_{SET}(x, \tilde{y})$ may be arranged 192. A logical decision 194 based on at least one comparison between a member of $M_{SET}(x, y)$ and a member of $M_{SET}(x, \tilde{y})$ decides which of y and $\tilde{y}$ has better image and/or video quality. Based on the decision an output $Q_A(x, y, \tilde{y})$, the better of y and $\tilde{y}$ is used to update an encoder memory buffer in-loop during the encoding process. Decision logic 194 block may also send out a re-encode signal, RE, if the image and video quality of either y or $\tilde{y}$ is not acceptable.

A number of different embodiments have been described. The techniques may be capable of improving video encoding by improving image and video quality through the use of an artifact evaluator in-loop during the encoding process. The techniques are standard compliant. The techniques also may be implemented in hardware, software, firmware, or any combination thereof. If implemented in software, the techniques may be directed to a computer-readable medium comprising computer-readable program code (also may be called computer-code), that when executed in a device that encodes video sequences, performs one or more of the methods mentioned above.

The computer-readable program code may be stored on memory in the form of computer readable instructions. In that case, a processor such as a DSP may execute instructions stored in memory in order to carry out one or more of the techniques described herein. In some cases, the techniques may be executed by a DSP that invokes various hardware components such as a motion estimator to accelerate the encoding process. In other cases, the video encoder may be implemented as a microprocessor, one or more application specific integrated circuits (ASICs), one or more field programmable gate arrays (FPGAs), or some other hardware-software combination. These and other embodiments are within the scope of the following claims.

The invention claimed is:

1. An apparatus configured to process video blocks comprising:
   a decoder operable to synthesize an un-filtered reconstructed video unit, wherein a video unit is at least one of video block and video frame;
   an artifact filter operable to receive the un-filtered reconstructed video unit, and that generates a filtered reconstructed video unit;
   a memory buffer operable to store either the filtered reconstructed video unit or the un-filtered reconstructed video unit; and
   an artifact evaluator operable to update the memory buffer.

2. The apparatus of claim 1, wherein the artifact evaluator comprises at least one artifact metric generator and a decision logic block.

3. The apparatus of claim 2, wherein any artifact metric generator amongst the at least one artifact metric generator is configured to receive the filtered reconstructed video unit or the un-filtered reconstructed video unit.

4. The apparatus of claim 3, wherein the at least one artifact metric generator is further configured to receive an unreconstructed video unit.

5. The apparatus of claim 4, wherein any artifact metric generator amongst the at least one artifact metric generator is configured to generate a non-original reference (NR) artifact metric or a full-original reference (FR) artifact metric.

6. The apparatus of claim 5, wherein a first artifact metric generator from the at least one artifact metric generator and a second artifact metric generator from the at least one artifact metric generator are coupled to a first decision logic block or a second decision logic block.

7. The apparatus of claim 6, wherein the first decision logic block is configured to receive the filtered reconstructed video unit and the un-filtered reconstructed video unit, and is further configured to compare a first NR artifact metric with a second NR artifact metric or to compare a first FR artifact metric with a second FR artifact metric, and based on the comparison output either the filtered reconstructed video unit or the un-filtered reconstructed video unit.

8. The apparatus of claim 7, wherein the output is sent to the memory buffer in-loop in a playback device, mobile device, or computer.

9. The apparatus of claim 6, wherein the second decision logic block is configured to receive the filtered reconstructed video unit and the un-filtered reconstructed video unit, and is further configured to compare a first set of NR artifact metrics with a first set of NR artifact metrics or to compare a first set of FR artifact metrics with a second set of FR artifact metrics, and based on the comparison output either the filtered reconstructed video unit or the un-filtered reconstructed video unit.

10. The apparatus of claim 8, wherein the output is sent to the memory buffer in-loop in a playback device, mobile device, or computer.

11. A method of artifact evaluation comprising:
    inputting an original video unit, wherein a video unit is at least one of video block and frame;
    inputting an un-filtered reconstructed video unit;
    inputting a filtered reconstructed video unit;

generating at least one artifact metric from the original video unit and the un-filtered reconstructed video unit; and generating at least one artifact metric from the original video unit and the filtered reconstructed video unit.

12. The method of claim 11, wherein any of the artifact metrics generated from the original video unit and the un-filtered reconstructed video unit and any of the artifact metrics generated from the original video unit and the filtered reconstructed video block measure the amount of blockiness or blurriness.

13. The method of claim 12, further comprising:

comparing one of the artifact metrics generated from the original video unit and the un-filtered reconstructed video unit with one of the artifact metrics generated from the original video unit and the filtered reconstructed video unit; and deciding to output the un-filtered reconstructed video unit or the filtered reconstructed video unit based on the comparison.

14. The method of claim 13, further comprising:

making a first comparison of at least one of the artifact metrics generated from the original video unit and the un-filtered reconstructed video unit with a first artifact threshold;

if any of the artifact metrics used in the first comparison is less than the first artifact threshold, making a second comparison of at least one of the artifact metrics generated from the original video unit and the un-filtered reconstructed video unit with a second artifact threshold;

if any of the artifact metrics used in the first comparison is less than the first artifact threshold and any of the artifact metrics used in the second comparison is less than the second artifact threshold, making a third comparison of at least one of the artifact metrics generated from the original video unit and the filtered reconstructed video unit with a third artifact threshold;

if any of the artifact metrics used in the third comparison is less than the third artifact threshold, making a fourth comparison of at least one of the artifact metrics generated from the original video unit and the filtered reconstructed video unit with a fourth artifact threshold;

deciding to output the filtered reconstructed video unit based on the first and second comparisons;

deciding to output the un-filtered reconstructed video unit based on the third and fourth comparisons; and if necessary, re-encoding based on either the third or fourth comparison.

15. The method of claim 13, wherein the filtered reconstructed video unit, or the un-filtered reconstructed video unit is stored in a memory buffer.

16. The method of claim 15, wherein the filtered reconstructed video unit, or the un-filtered reconstructed video unit is stored in a memory buffer as part of an encoding process.

17. A method in an image/video encoder comprising:

updating a memory buffer with an output of an artifact evaluator, wherein the artifact evaluator is used in-loop; and making a decision using a first set of artifact metrics and a second set of artifact metrics to make a comparison, and wherein based on the comparison the artifact evaluator outputs a filtered reconstructed video unit or an un-filtered reconstructed video unit to the memory buffer, wherein a video unit is at least one of video block and frame.

18. The method of claim 17, wherein the memory buffer stores either the filtered reconstructed video unit or the un-filtered reconstructed video unit.

19. The method of claim 18, wherein the first set of metrics is based on an original video unit and the un-filtered reconstructed video unit, wherein the original video unit is an unreconstructed video unit.

20. The method of claim 19, wherein the second set of metrics is based on the original video unit and the filtered reconstructed video unit.

21. The method of claim 19, wherein the second set of metrics is based on the filtered reconstructed video unit.

22. The method of claim 18, wherein the first set of metrics is based on the un-filtered reconstructed video unit.

23. The method of claim 17, wherein the first set of artifact metrics and the second set of artifact metrics, include the following artifact metric implementation:

$$ASNR(y) = 10 * \log_{10}\left(\frac{PKS \cdot W_S \cdot W_P \cdot W_T}{F(y)}\right), \text{ where}$$

y represents either a un-filtered reconstructed video unit or a filtered reconstructed video unit;

PKS is the peak value of the pixel squared;

$W_S$ is a weight that affects the un-filtered reconstructed video unit, based on spatial factors;

$W_P$ is a weight that affects the un-filtered reconstructed video unit, based on perceptual factors;

$W_T$ is a weight that affects the un-filtered reconstructed video unit, based on temporal factors; and F(y) is a function of y.

24. The method of claim 23, wherein ASNR(y) is DSNR(y) if F(y) is Norm_Factor(MSDS(y)); and Norm_Factor involves taking either an absolute value or a squaring.

25. The method of claim 24, wherein the measuring of the artifact further comprises:

emphasizing or de-emphasizing a blockiness artifact through a combination of values $W_S, W_P$, or $W_T$.

26. The method of claim 17, wherein the first set of artifact metrics and the second set of artifact metrics, include the following artifact metric implementation:

$$ASNR(x, y) = 10 * \log_{10}\left(\frac{PKS \cdot W_S \cdot W_P \cdot W_T}{F(x, y)}\right), \text{ where}$$

y represents either a un-filtered reconstructed video unit or a filtered reconstructed video unit;

x represents the original video unit, wherein a video unit is at least one of video block and frame;

PKS is the peak value of the pixel squared;

$W_S$ is a weight that affects the filtered reconstructed video unit, based on spatial factors;

$W_P$ is a weight that affects the filtered reconstructed video unit, based on perceptual factors;

$W_T$ is a weight that affects the filtered reconstructed video unit, based on temporal factors; and F(x,y) is a function of x and y.

27. The method of claim 26, wherein ASNR(x,y) is DSNR(x,y) if F(x,y) is MSDS_error(x,y);

MSDS_error(x,y) =Norm_Factor(MSDS(x)−MSDS(y));

MSDS(x) is the Mean Square Slope of Differences of (x);

MSDS(y) is the Mean Square Slope of Differences of (y); and

Norm_Factor involves taking either an absolute value or a squaring.

28. The method of claim 27, wherein the measuring of the artifact further comprises:
emphasizing or de-emphasizing a blockiness artifact through a combination of values $W_S, W_P$, or $W_T$.

29. An apparatus comprising:
means for updating a memory buffer with an output of an artifact evaluator; and
means for making a decision with a decision logic block of the artifact evaluator, wherein the means for making the decision uses a first set of artifact metrics and a second set of artifact metrics to make a comparison, and wherein based on the comparison the artifact evaluator outputs a filtered reconstructed video unit or an un-filtered reconstructed video unit, wherein a video unit is at least one of video block and frame.

30. The apparatus of claim 29, wherein the memory buffer stores either the filtered reconstructed video unit or the un-filtered reconstructed video unit.

31. The apparatus of claim 30, wherein the first set of metrics is based on an unreconstructed video unit and the un-filtered reconstructed video unit.

32. The apparatus of claim 31, wherein the second set of metrics is based on the original video unit and the filtered reconstructed video unit.

33. The apparatus of claim 31, wherein the second set of metrics is based on the filtered reconstructed video unit.

34. The apparatus of claim 30, wherein the first set of metrics is based on the un-filtered reconstructed video unit.

35. A non-transitory computer-readable medium configured to store a set of instructions, where the instructions, when executed, perform a method comprising:
updating a memory buffer with an output of an artifact evaluator; and
making a decision using a first set of artifact metrics and a second set of artifact metrics to make a comparison, and wherein based on the comparison the artifact evaluator outputs a filtered reconstructed video unit or an un-filtered reconstructed video unit, wherein a video unit is at least one of video block and frame.

36. The computer-readable medium of claim 35, wherein the memory buffer stores either the filtered reconstructed video unit or the un-filtered reconstructed video unit.

37. The computer-readable medium of claim 36, wherein the first set of metrics is based on an unreconstructed video unit and the un-filtered reconstructed video unit.

38. The computer-readable medium of claim 37, wherein the second set of metrics is based on the original video unit and the filtered reconstructed video unit.

39. The computer-readable medium of claim 37, wherein the second set of metrics is based on the filtered reconstructed video unit.

40. The computer-readable medium of claim 36, wherein the first set of metrics is based on the un-filtered reconstructed video unit.

* * * * *